United States Patent
An et al.

(10) Patent No.: US 6,725,173 B2
(45) Date of Patent: Apr. 20, 2004

(54) DIGITAL SIGNAL PROCESSING METHOD AND SYSTEM THEREOF FOR PRECISION ORIENTATION MEASUREMENTS

(75) Inventors: Dong An, Simi Valley, CA (US); Ching-Fang Lin, Simi Valley, CA (US)

(73) Assignee: American GNC Corporation, Simi Valley, CA (US)

(*) Notice: Subject to any disclaimer, the term of this patent is extended or adjusted under 35 U.S.C. 154(b) by 64 days.

(21) Appl. No.: 09/946,908

(22) Filed: Sep. 4, 2001

(65) Prior Publication Data

US 2002/0059027 A1 May 16, 2002

Related U.S. Application Data

(60) Provisional application No. 60/230,567, filed on Sep. 2, 2000.

(51) Int. Cl.[7] .............................. G01S 5/02; G01C 21/04; F41G 7/00
(52) U.S. Cl. ................ 702/141; 244/3.2; 342/457; 342/357.14; 382/107; 701/34; 702/95; 702/97; 702/150
(58) Field of Search .................. 702/95, 97, 141, 702/142, 150, 151, 155; 342/357.01, 357.06, 357.14, 457; 701/213, 214, 220; 244/3.2; 382/107

(56) References Cited

U.S. PATENT DOCUMENTS

| | | | | |
|---|---|---|---|---|
| 5,075,693 A | * | 12/1991 | McMillan et al. | 342/457 |
| 5,875,257 A | * | 2/1999 | Marrin et al. | 382/107 |
| 6,032,108 A | * | 2/2000 | Seiple et al. | 702/97 |
| 6,131,058 A | * | 10/2000 | Boeinghoff et al. | 701/34 |
| 6,163,021 A | * | 12/2000 | Mickelson | 244/3.2 |
| 6,421,622 B1 | * | 7/2002 | Horton et al. | 702/95 |
| 6,427,131 B1 | * | 7/2002 | McCall et al. | 702/150 |
| 6,480,152 B2 | * | 11/2002 | Lin et al. | 342/357.14 |

* cited by examiner

Primary Examiner—John Barlow
Assistant Examiner—John Le
(74) Attorney, Agent, or Firm—Raymond Y. Chan; David and Raymond Patent Group

(57) ABSTRACT

The present invention provides a digital signal processing method and system thereof for producing precision platform orientation measurements and local Earth's magnetic measurements by measuring threes axes gravity acceleration digital signals by an acceleration producer, detecting Earth's magnetic field vector measurement by an Earth's magnetic field detector to achieve digital three-axes Earth's magnetic field vector signals, and producing pitch, roll, and heading angles using said three-axes gravity acceleration digital signals and said digital three-axes Earth magnetic field vector signals by a Digital Signal Processor (DSP) chipset.

36 Claims, 7 Drawing Sheets

DIGITAL SIGNAL PROCESSING METHOD AND SYSTEM THEREOF FOR PRECISION ORIENTATION MEASUREMENTS

CROSS REFERENCE OF RELATED APPLICATION

This is a regular application of a provisional application having an application No. 60/230,567 and a filing date of Sep. 2, 2000.

BACKGROUND OF THE PRESENT INVENTION

1. Field of the Present Invention

The present invention relates to an orientation measurement method and system, and more particularly to an orientation measurement method and system with three-axes acceleration producers and an Earth's magnetic detector and a Digital Signal Processing (DSP) technique, which can produce highly accurate, digital, attitude, and heading measurements of a static platform, such as pitch, roll, and heading, and the local Earth's magnetic field vector measurements.

2. Description of Related Arts

Conventionally, the system that can provide attitude and heading measurements of a static platform includes: an inertial measurement unit (IMU) that can provide attitude, and heading measurements; a vertical gyro that can provide pitch and roll measurements; directional gyro that can provide heading measurements; a compass that can provide heading measurement; a tilt sensor that can provide pitch and roll angle measurements.

The principle that the IMU determines the attitude and heading measurements of the static platform depends on the so-called self-alignment capability, which uses gravity acceleration to compute a local level-plane, and the Earth rate vector to determine heading direction. It is well known that Gravity acceleration is a strong signal. Unfortunately, the Earth rate vector is a very weak signal. For example, modern aircraft are capable of angular rates exceeding 400 deg/sec or nearly one hundred thousand times the Earth's rotation rate of 15 deg/hr. Furthermore, the horizontal component of the Earth rate is a function of latitude areas, and decreases substantially as latitude increases. For example, at 45 degrees latitude, the north Earth rate decreases to 10.6 degrees/hr, while at 70 degrees latitude, the value is only 5.13 degrees/hr. As latitude approaches 90 degrees, the north Earth rate vanishes and heading becomes undefined. Because of the small magnitude of the Earth rate, the heading is always more difficult to acquire than are pitch and roll for a low cost, low quality IMU. For example, an IMU with 1 deg/hr angular rate producers is typically capable of approximately 5 degrees initial heading at mid-latitude areas.

The magnetic compass has been used for centuries. Today, the balanced needle compass and the gimbaled compass are variations of the early magnetic compass. However, these compasses have big size and low accuracy and slow response time.

Therefore, conventional orientation systems commonly have the following features: high cost; large bulk (volume, mass, large weight); high power consumption; limited lifetime, and; long turn-on time. These present deficiencies of conventional orientation measurement systems prohibit them from use in the emerging commercial applications, such as phased array antennas for mobile communications, automotive navigation, and handheld equipment.

The silicon revolution began over three decades ago, with the introduction of the first integrated circuit. The integrated circuit has changed virtually every aspect of our lives. One of the benefits of the silicon revolution is today's powerful digital signal processor. The hallmark of the integrated circuit industry over the past three decades has been the exponential increase in the number of transistors incorporated onto a single piece of silicon. This rapid advance in the number of transistors per chip leads to integrated circuits with continuously increasing capability and performance. As time has progressed, large, expensive, complex systems have been replaced by small, high performance, inexpensive integrated circuits. While the growth in the functionality of microelectronic circuits has been truly phenomenal, for the most part, this growth has been limited to the processing power of the chip.

As in the previous silicon revolution, a new sensor revolution is coming. MEMS (MicroElectronicMechanicalSystem), or, as stated more simply, micromachines, are considered the next logical revolution after the silicon revolution. It is believed that this coming revolution will be different, and more important than simply packing more transistors onto silicon. The hallmark of the next thirty years of the silicon revolution including MEMS will be the incorporation of new types of functionality onto the chip structures, which will enable the chip to, not only think, but to sense, act, and communicate as well.

MEMS accelerometers are one of the results of the MEMS sensor techniques. Several MEMS accelerometers incorporate piezoresistive bridges such as those used in early micromechanical pressure gauges. More accurate accelerometers are the force rebalance type that use closed-loop capacitive sensing and electrostatic forcing. For example, a type of micromechanical accelerometer is a monolithic silicon structure consisting of a torsional pendulum with capacitive readout and electrostatic torquer. Another type of MEMS accelerometer has interdigitated polysilicon capacitive structure fabricated with an on-chip BiMOS process to include a precision voltage reference, local oscillators, amplifiers, demodulators, force rebalance loop and self-test functions. MEMS based magnetic sensors are also under development and test.

It is still very challenging to design an orientation measurement system for a small platform with limitations of power budget, size, and weight. Digital Signal Processing (DSP) is one of the most advanced technologies that will be a driving force for science and engineering in the twenty-first century. The method and system of the present invention addresses the need of an orientation measurement system for a small platform with limitations of power budget, size, and weight using MEMS and DSP technologies.

SUMMARY OF THE PRESENT INVENTION

A main objective of the present invention is to provide a digital signal processing method and system thereof for producing precision orientation measurements, which employs MEMS based accelerometers and magnetic sensors with the powerful DSP device and algorithms to achieve a miniaturized orientation measurement system.

Another objective of the present invention is to provide a digital signal processing method and system thereof for precision orientation measurements and local Earth's magnetic field vector measurements, which can achieve a stabilized, highly accurate orientation measurement with increased system flexibility and reduced time of circuit and control design.

Another objective of the present invention is to provide a digital signal processing method and system thereof for precision orientation measurements and local Earth's magnetic field vector measurements, wherein MEMS accelerometer, micro magnetoresistance sensor, and Digital Signal Processor (DSP), as well as analog signal conditioning and Analog/digital circuitry, are integrated to deliver orientation measurement solutions to stabilisation, orientation and alignment requirements of many commercial platforms.

Another objective of the present invention is to provide a digital signal processing method and system thereof for precision orientation measurements and local Earth's magnetic field vector measurements, wherein MEMS accelerators measure gravity accelerations about the body axes of the platform; the low-level gravity acceleration analog signals from the MEMS accelerometer are converted into a digital output, which are digitally processed to obtain orientation information, to provide superior performance to alternative analog techniques.

Another objective of the present invention is to provide a digital signal processing method and system thereof for precision orientation measurements and local Earth's magnetic field vector measurements, wherein the magnetometer detects the components of the earth's magnetic field vector about the body axes of the platform, which are digitized and transformed into the components of the earth's magnetic field vector in the level-plane. The components of the earth's magnetic field vector in the level-plane are proportional to the sine and cosine of the platform magnetic heading angle, which magnetic heading is derived based on.

Another objective of the present invention is to provide a digital signal processing method and system thereof for precision orientation measurements and local Earth's magnetic field vector measurements, wherein MEMS accelerometer's faster response and settling than traditional liquid tilt sensors, up to 100 hz response, are exploited to achieve orientation measurements without "slosh" or leaking problems associated with traditional liquid tilt sensors.

Another objective of the present invention is to provide a digital signal processing method and system thereof for precision orientation measurements of a platform and local Earth's magnetic field vector measurements, wherein a velocity producer is further incorporated to compensate the platform motion acceleration to deal with the platform motion.

The orientation measurement systems can offer many advantages, such as shock and vibration resistance, software compensation for stray field effects, which can be used for navigation, survey, research, training, construction, entertainment, pointing and leveling applications.

DETAILED DESCRIPTION OF THE PREFERRED EMBODIMENT

Referring to FIGS. 1 to 7, a digital signal processing method and system therefore for continuously determining the attitude and heading measurements of a platform according to a preferred embodiment of the present invention is illustrated.

Figure 1:
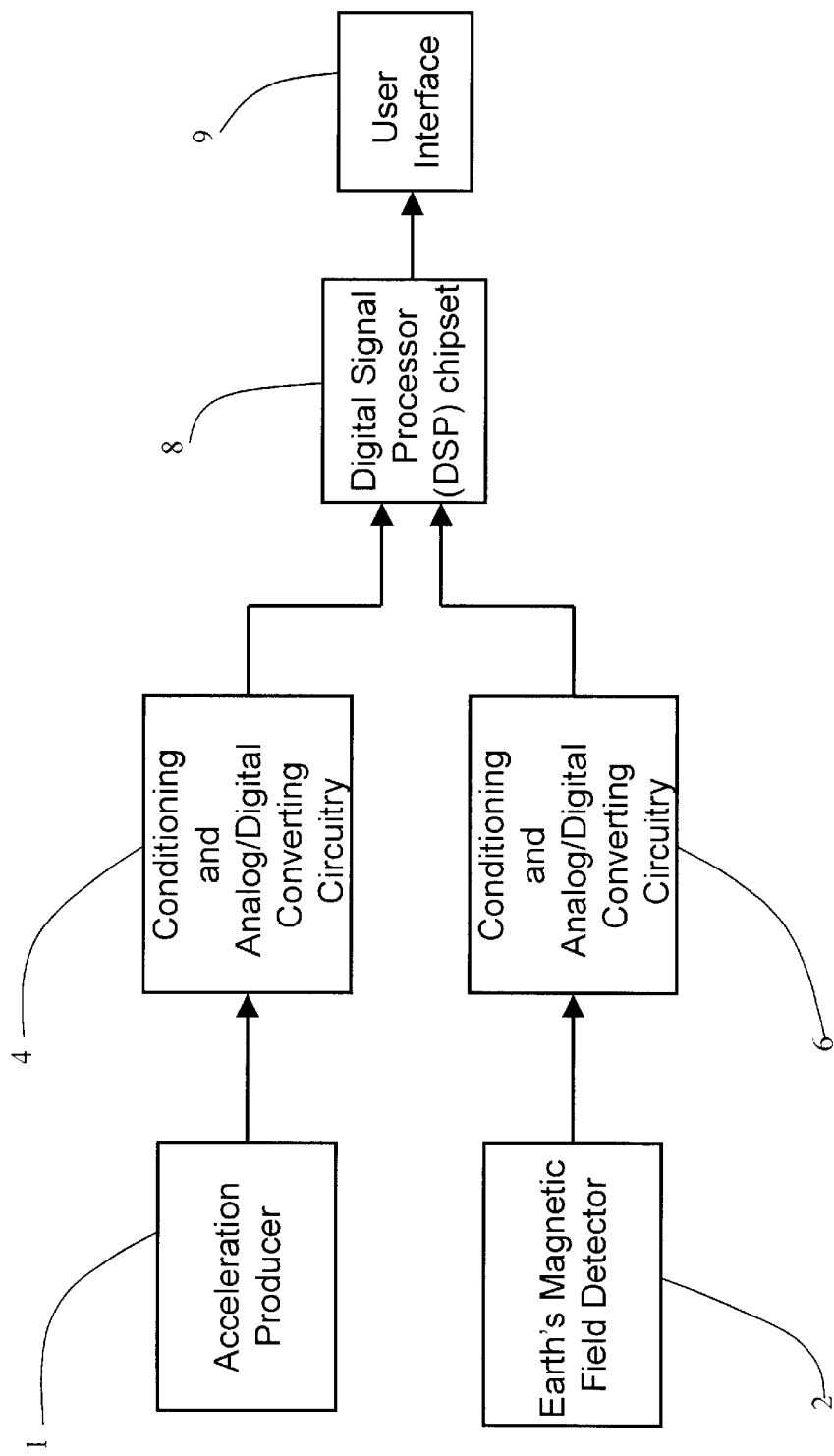
FIG. 1 is a block diagram illustrating a DSP method and system for orientation measurements.
Figure 2:
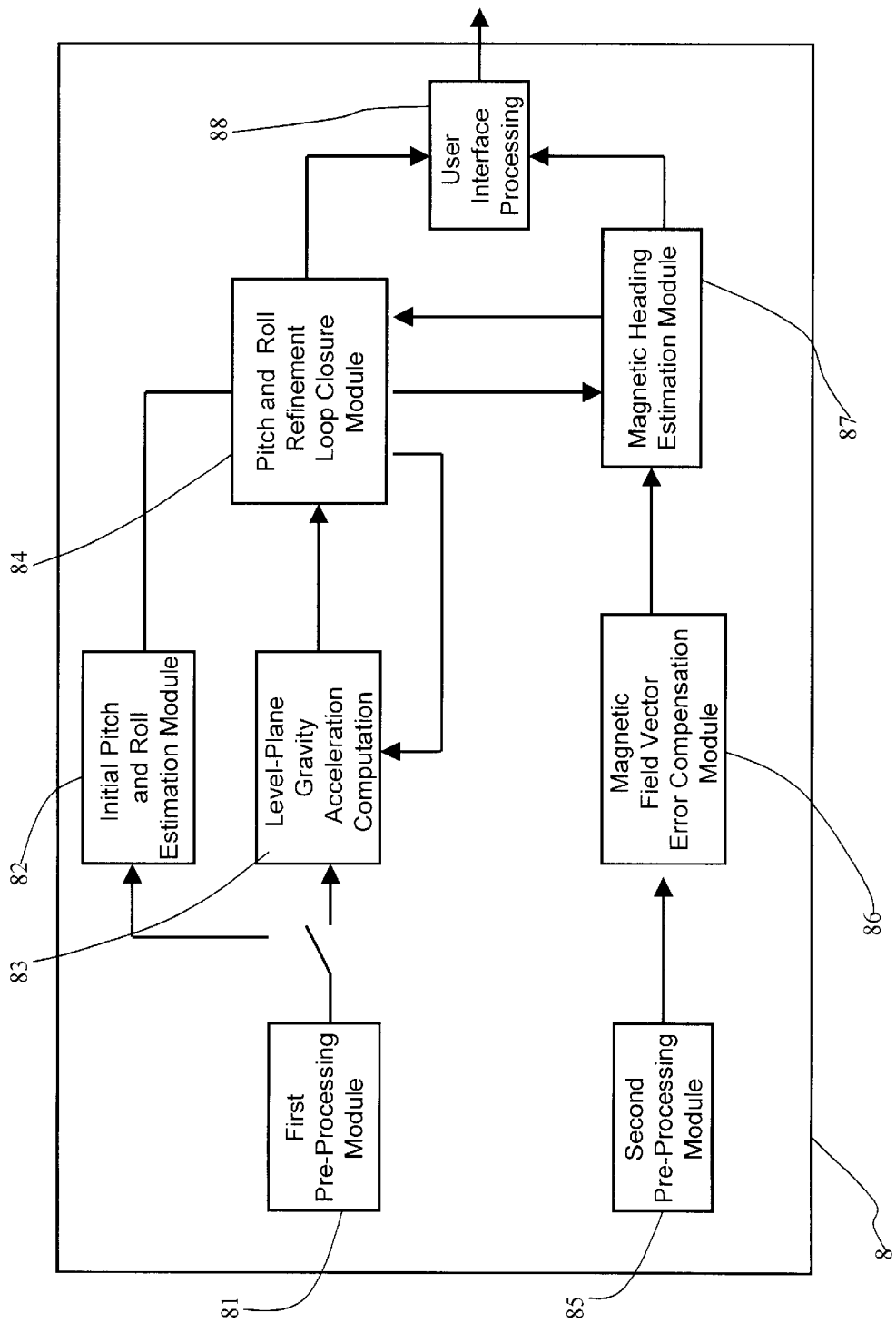
FIG. 2 is a block diagram illustrating the processing flow of the DSP processing modules running in the DSP chipset.
Figure 3:
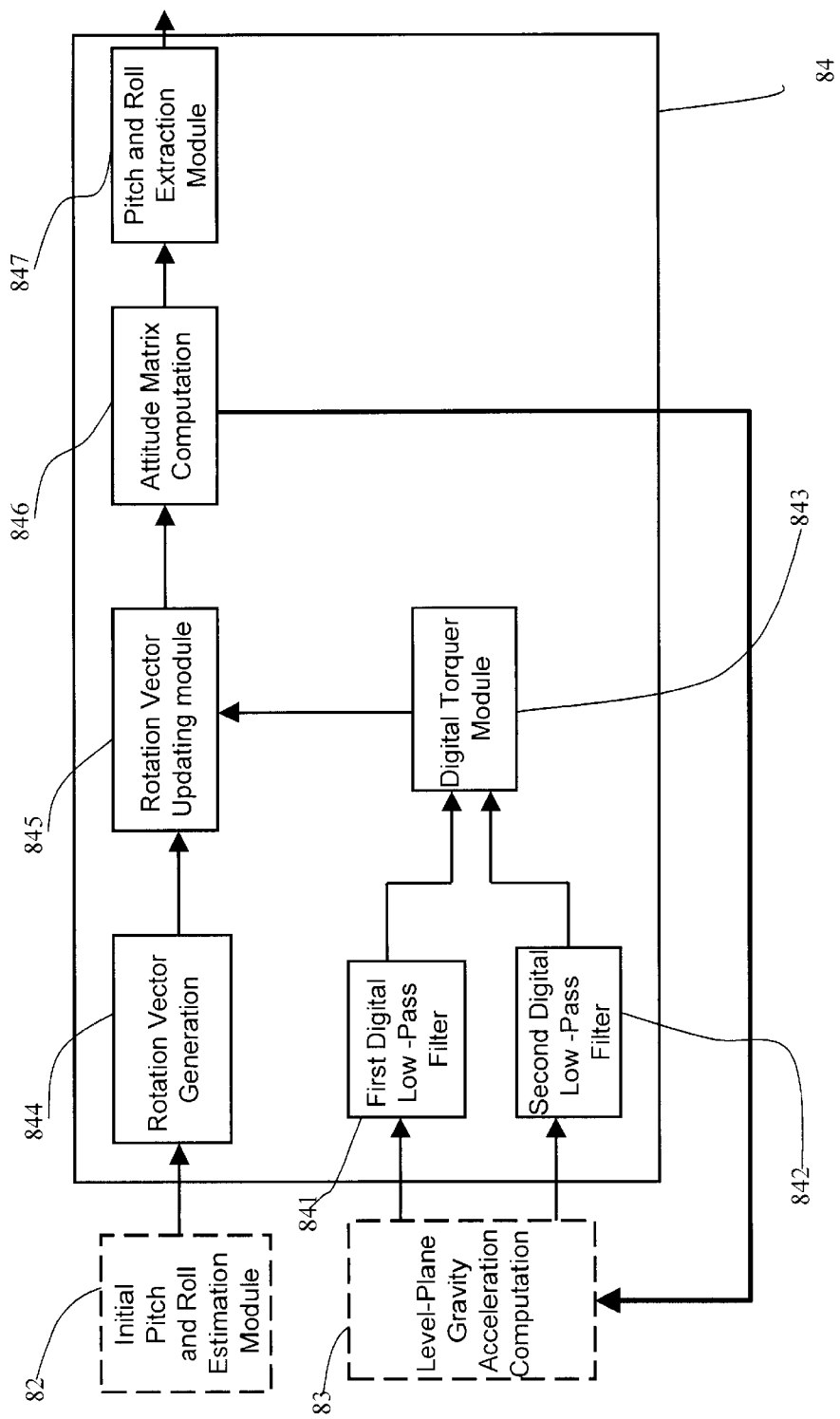
FIG. 3 is a block diagram illustrating the processing flow of the pitch and roll refinement loop closure module.

Referring to FIGS. 1 to 3, the digital signal processing system for platform orientation measurements comprises an acceleration producer 1, an Earth's magnetic field detector 2, a first conditioning and analog/digital converting circuitry 4, a second conditioning and analog/digital converting circuitry 6, a DSP chipset 8, and a user interface 9.

The acceleration producer 1 measures the gravity acceleration analog signals in three-axes expressed in platform body frame. The Earth's magnetic field detector 2 detects the Earth's magnetic field analog signals in three-axes expressed in platform body frame.

The first conditioning and analog/digital converting circuitry 4 is adapted for suppressing noise of the gravity acceleration analog signals and digitizing the gravity acceleration analog signals to form three-axes gravity acceleration digital signals. The second conditioning and analog/digital converting circuitry 6 is adapted for suppressing noise of the Earth's magnetic field analog signals and digitizing the Earth's magnetic field analog signals to form three-axes the Earth's magnetic field digital signals.

The DSP chipset 8 is interfaced with the first conditioning and analog/digital converting circuitry 4 and the second conditioning and analog/digital converting circuitry 6, for receiving the three-axes gravity acceleration digital signals and three-axes digital Earth's magnetic field vector and producing the attitude and heading measurements using the DSP algorithms.

The user interface 9 is connected with the DSP chipset 8 for providing a user with the data display and I/O (Input/Output) functions.

The preferred acceleration producer 1 comprises three MEMS accelerometers, which are orthogonally installed to achieve orthogonal three-axes gravity acceleration measurements.

The first conditioning and analog/digital converting circuitry 4 and the second conditioning and analog/digital converting circuitry 6 can be implemented by PCB (Printed Circuit Board) or specific IC (Integrated Circuit).

The Earth's magnetic field detector 2 is a device for measuring the Earth's magnetic field vector, including a fluxgate, magnetoresistance (MR) sensor, and magnetoinductive sensors. Recent magnetoresistance (MR) sensors show sensitivities below 0.1 milligauss, come in small solid state packages, and have a response time less than 1 microsecond. These MR sensors allow reliable magnetic readings in a moving vehicle at rates up to 1000 Hz. Therefore, the preferred Earth's magnetic field detector are three orthogonally mounted magnetometers with magnetoresistive sensors. The magnetoresistive sensors are an excellent replacement for traditional flux gate magnetic sensors. The advantages over flux gates include miniaturized size, ease and low cost in manufacturability, and improved reliability.

The first conditioning and analog/digital converting circuitry 4, connected between the acceleration producer 1 and the DSP chipset 8, performs the following steps:

(1) acquiring the electronic gravity acceleration analog signals, which are proportional to the Earth's gravity field, from the acceleration producer 1;

(2) amplifying the gravity acceleration analog signals to suppress noise in the electronically analog signal, which is not proportional to the Earth's gravity field;

(3) converting the amplified gravity acceleration signals to form three-axes gravity acceleration digital signals, which are input to the DSP chipset 8; and (4) providing data/control/address bus connection with the DSP chipset 8 and producing an address decode function, so that the DSP chipset 8 can access the acceleration producer 1 and pickup the three-axes gravity acceleration signals.

The second conditioning and analog/digital converting circuitry 6, connected between the Earth's magnetic field detector 2 and the DSP chipset 8, performs the following steps:

(5) acquiring the electronic analog Earth's magnetic field signals, which are proportional to the Earth's gravity field, from the Earth's magnetic field detector;

(6) amplifying the analog Earth's magnetic field signals to suppress noise in the electronically analog signal, which is not proportional to the Earth's gravity field;

(7) converting the amplified Earth's magnetic field signals to form three-axes digital Earth's magnetic field signals, which are input to the DSP chipset 8; and (8) providing data/control/address bus connection with the DSP chipset 8 and producing an address decode function, so that the DSP chipset 8 can access the Earth's magnetic field detector 2 and pickup the three-axes digital Earth's magnetic field signals.

The DSP chipset 8 comprises a DSP chip and some type of non-volatile memory (NVM), such as a flash memory chip, and other peripherals, as well as embedded DSP software. The NVM provides a storage means of the embedded DSP when the system of the present invention is powered off.

Referring to FIG. 2, the embedded DSP software that the DSP chipset 8 performs comprise a first pre-processing module 81, an initial pitch and roll estimation module 82, a level-plane gravity acceleration computation module 83, a pitch and roll refinement loop closure module 84, a second pre-processing module 85, a magnetic field vector error compensation module 86, a magnetic heading estimation module 87, and a user interface processing module 88.

The first pre-processing module 81 is used to smooth the three-axes gravity acceleration digital signals at high sampling rate, which are expressed in the body frame and compensate errors in the three-axes gravity acceleration digital signals with calibration parameters, including scale factor, bias and misalignment. The smoothed and compensated three-axes gravity acceleration digital signals are output to the initial pitch and roll estimation module 82 and the level-plane gravity acceleration computation module 83.

Consider the solution for smoothing of N samples of the three-axes gravity acceleration digital signals, at each epoch, the three-axes gravity acceleration digital signals can be expressed as follows:

$$Z_K = X_K + V_K, K=1, 2, 3 \ldots N$$

The result of smoothing of N samples of the three-axes gravity acceleration digital signals is $$\hat{A}_K = \frac{1}{N}\sum_{K=1}^{N} X_K \quad K = 1, 2, 3 \ldots N$$

In practice, the alternative recursive form of the above equation is more convenient to implement as follows:

$$\hat{A}_{K+1} = \hat{A}_K + \frac{1}{K+1}(Z_K - \hat{A}_K), \quad K = 0, 1, 2, 3 \ldots N-1$$

Accelerometers measure the specific force caused by the motion of a platform. The specific force consists of the gravity acceleration and the motion acceleration with respect to the inertial space:

$$f = a_i - g$$

The acceleration with respect to the inertial space, $a_i$, can be expressed in the N frame system as $$a_i^n = \dot{V}^n + (\omega_{en}^n + 2\omega_{ie}^n) \times V^n + \omega_{ie}^n \times (\omega_{ie}^n \times R)$$

Defining $G = g - \omega_{ie}^n \times (\omega_{ie}^n \times R)$ we have $$f^n = -G + \dot{V}^n + (\omega_{en}^n + 2\omega_{ie}^n) \times V^n$$

and the outputs of the accelerometers can be written as $$f_{out} = f_b$$
$$= C_n^b f^n$$
$$= C_n^b \left( -G + \dot{V}^n + (\omega_{en}^n + 2\omega_{ie}^n) \times V^n \right)$$

In the above equation, N is the level-plane frame, b is the body frame, G is the gravity model expressed in the N frame. In most inertial systems, the direction of G is assumed to be identical with the $z_n$ axis of the N frame. Thus G can be expressed as $$G = \begin{bmatrix} 0 \\ 0 \\ g \end{bmatrix}$$

where g is the normal gravity expressed as $$g = g_0 \left[ 1 - 2A\left(\frac{h}{a}\right) + B\sin^2\varphi \right]$$

where
A=1+f+m
B=2.5m−f
f=flattening of the WGS-84 ellipsoid.
m=$\Omega^2 a^2 b/GM$
$g_0$=equatorial gravity.
h=altitude
M=mass of the earth.
G=gravitational constant.

The ideal accelerometer measures the specific force of the platform motion with respect to inertial space in its sensitive axis direction and thus the output of the accelerometer is proportional to the specific force:

$$f_{out} = K_a f_{ib} = K_a(-G_{ib} + A_{ib})$$

where G is the gravitational acceleration and A is the acceleration caused by the motion of the aircraft. But in practice, the output of the accelerometer also contains a variety of errors. In general, the static model of the accelerometer can be given by $$f_{out} = K_a f_{ib} + \nabla$$

where $\nabla$ is the generalized accelerometer bias error. The three axis generalized accelerometer bias errors are modeled as follows $$\nabla_x = \nabla_{bx} + \nabla_{cx} + \nabla_{rx} + \nabla_{tx}(T) + \nabla_{non\_x} + \nabla K_{ax} f_{inx} + \nabla_{fx} + w_{ax}(t)$$

$$\nabla_y = \nabla_{by} + \nabla_{cy} + \nabla_{ry} + \nabla_{ty}(T) + \nabla_{non\_y} + \nabla K_{ay} f_{iny} + \nabla_{fy} + w_{ay}(t)$$

$$\nabla_z = \nabla_{bz} + \nabla_{cz} + \nabla_{rz} + \nabla_{tz}(T) + \nabla_{non\_z} + \nabla K_{az} f_{inz} + \nabla_{fz} + w_{az}(t)$$

where $\nabla_{bi}$, i=x,y,z, is the fixed accelerometer bias. For a definite accelerometer device this bias is constant.

$\nabla_{ci}$, i=x,y,z, is the random constant accelerometer bias. This error is actually a function of time and varies very slowly. And for different power turn-on to turn-off operations, its repeatability can change.

$\nabla_{ri}$, i=x,y,z, is the random walk of accelerometer bias. This bias can be modeled as a band-limited white noise or a first-order Markov stochastic process. Random walk is a critical factor to accelerometer performance.

$\nabla_{ti}(T)$, i=x,y,z, is the temperature related accelerometer bias. This bias varies with the change of the temperature of the accelerometer device. Generally the relation between the bias and temperature is definite and can be obtained through the testing data.

$\nabla_{non\_i}$, i=x,y,z, is the nonlinear error of the accelerometer. This kind of error can be rather large when the accelerometer experiences a large input acceleration. But the nonlinear error is basically a systematic error and it can be written as $$\nabla_{non\_x} = a_{1x} f_{ibx}^2 + a_{2x} f_{ibx}^3 + a_{3x} f_{ibx}^4 + \ldots$$

$$\nabla_{non\_y} = a_{1y} f_{iby}^2 + a_{2y} f_{iby}^3 + a_{3y} f_{iby}^4 + \ldots$$

$$\nabla_{non\_z} = a_{1z} f_{ibz}^2 + a_{2z} f_{ibz}^3 + a_{3z} f_{ibz}^4 + \ldots$$

From the laboratory test data, the accelerometer nonlinear error characteristics can be determined.

$\nabla K_{aj} f_{ink}$, j,k=x,y,z, is the scale factor error of the accelerometer. This error is proportional to the input specific force, and can be large with respect to high dynamic application scenarios.

$\nabla_{fi}$, i=x,y,z, is the sense axis misalignment error. This error can be approximately expressed as follows $$\nabla_{fx} = c_{xy} f_y + c_{xz} f_z$$

$$\nabla_{fy} = c_{yx} f_x + c_{yz} f_z$$

$$\nabla_{fz} = c_{zx} f_x + c_{zy} f_y$$

It arises due to fabrication or installation imprecision. $w_{ai}(t)$, i=x,y,z, is the oscillating error of the accelerometer. This kind of oscillating interference is high frequency, generally hundreds of hertz. It can be expressed as the sum of a series of sine functions of time.

The initial pitch and roll estimation module 82 only runs one time initially to provide rough pitch and roll angle estimates using the input gravity acceleration digital signals.

The level-plane gravity acceleration computation module 83 receives the smoothed three-axes gravity acceleration digital signals and a transform matrix from the body frame to the level-plane frame from the pitch and roll refinement loop closure module 84, and transforms the smoothed three-axes gravity acceleration digital signals into the gravity acceleration data expressed in the level-plane frame.

The pitch and roll refinement loop closure module 84 receives the rough pitch and roll angle from the initial pitch and roll estimation module and level-plane gravity acceleration components from the level-plane gravity acceleration computation module 83 and heading angle from the magnetic heading estimation module 87 to refine the rough pitch and roll angles.

The second pre-processing module 85 is used to smooth the three-axes digital Earth's magnetic signals at high sampling rate, which are expressed in the body frame. The smoothed three-axes Earth's magnetic digital signals are output to the magnetic field vector error compensation module 86.

The magnetic field vector error compensation module 86 performs a compensation procedure using calibration parameters, including scale factors, misalignment parameters, and the effects of nearby ferrous materials.

The magnetic heading estimation module 87 receives the three-axes digital Earth's magnetic field signals from the magnetic field vector error compensation module 86 and the pitch and roll angle data from the pitch and roll refinement loop closure module 84 to estimate an optimal heading angle, which is output to the pitch and roll refinement loop closure module 84.

The magnetic heading estimation module 87 further performs:

(1) receiving the pitch and roll angle data from the pitch and roll refinement loop closure module to form a transformation matrix from the body frame to level-plane navigation frame;

(2) transforming the Earth's magnetic vector from the body frame to the level-plane frame to form a measurement vector, which is expressed in the level-plane navigation frame;

(3) estimate magnetic heading data using the measurement vector expressed in the level-plane navigation frame, which is output to the pitch and roll refinement loop closure module 84 and the user interface processing module 88.

The user interface processing module 88 performs the display processing tasks and I/O processing tasks.

Referring to FIG. 3, the pitch and roll refinement loop closure module 84 further comprises:

The first digital low pass filter 841 receives the X component of the level-plane gravity acceleration data from the level-plane gravity acceleration computation module 83 to reject high frequency noise of the X component of the level-plane gravity acceleration data. The filtered X component of the level-plane gravity acceleration data is output to the digital torquer module 843.

The second digital low pass filter 843 receives the Y component of the level-plane gravity acceleration data from the level-plane gravity acceleration computation module 83 to reject high frequency noise of the Y component of the level-plane gravity acceleration data. The filtered Y component of the level-plane gravity acceleration data is output to the digital torquer module 843.

Digital filters are designed for two general purposes: (1)-extracting signals from the combined signal, and (2) re-constructing signals that have been mis-formed or distorted in some way. Generally, analog (electronic) filters can be used for these same purposes. However, digital filters can achieve far superior performance.

Figure 4:
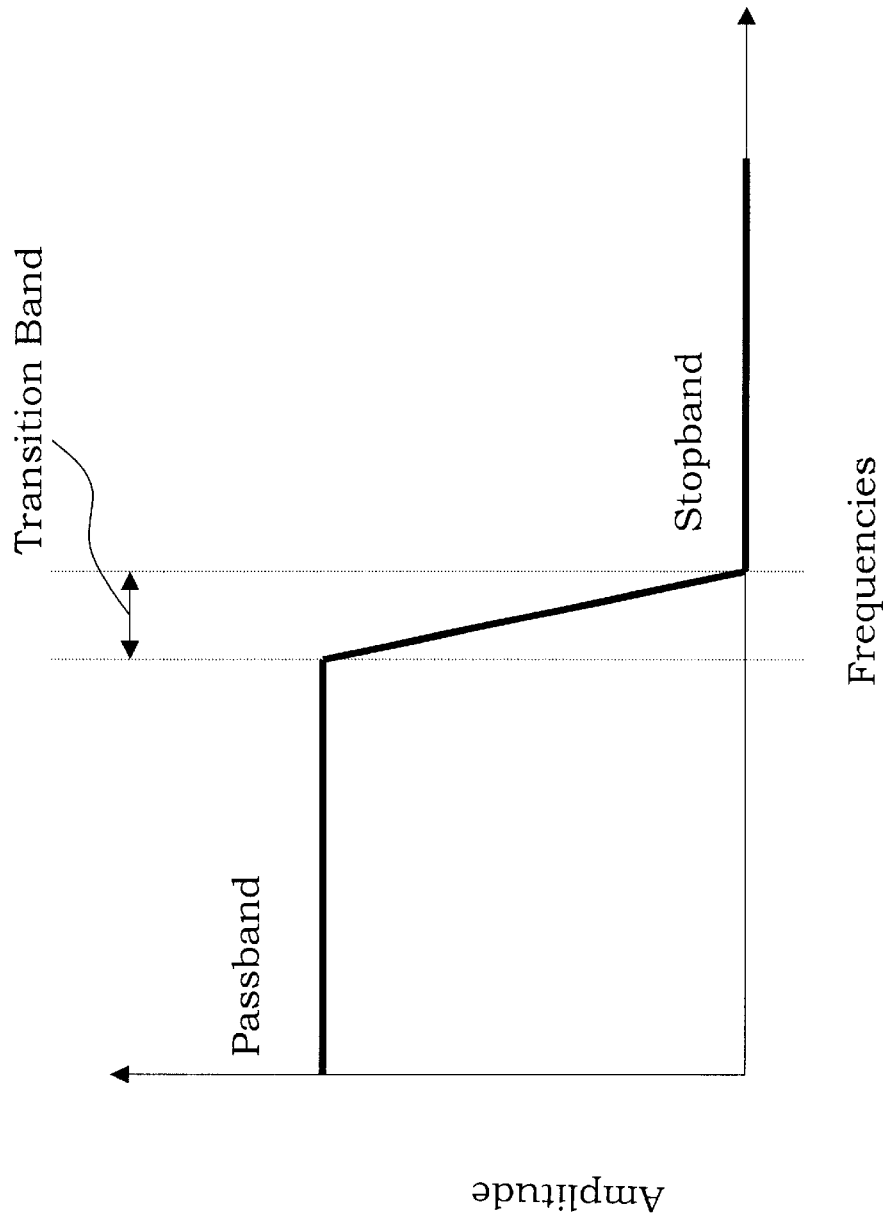
FIG. 4 illustrates the bandwidth of the low-pass filter of the present invention.
Figure 5:
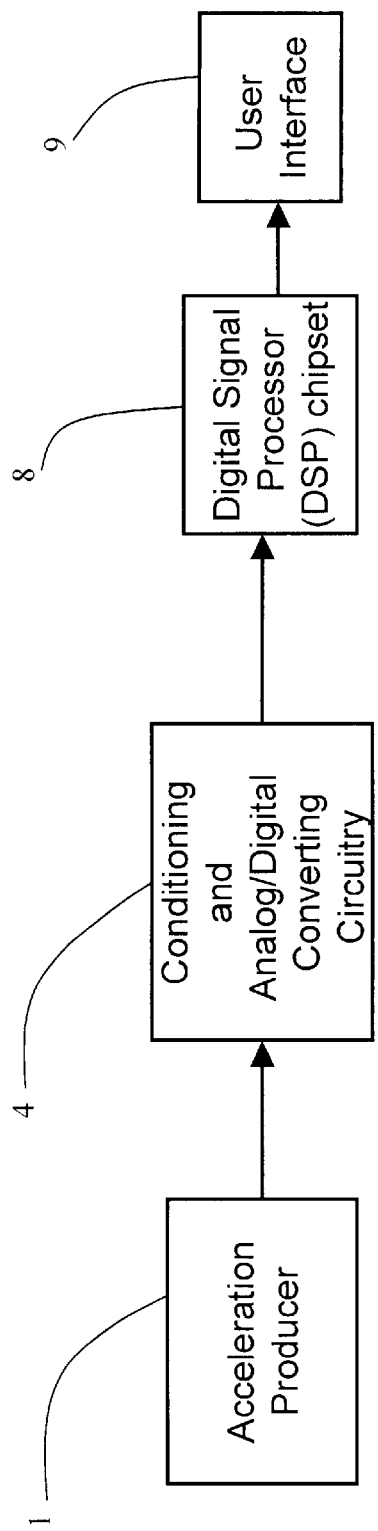
FIG. 5 is a block diagram illustrating the first alternative embodiment of the present invention for roll and pitch determination.
Figure 6:
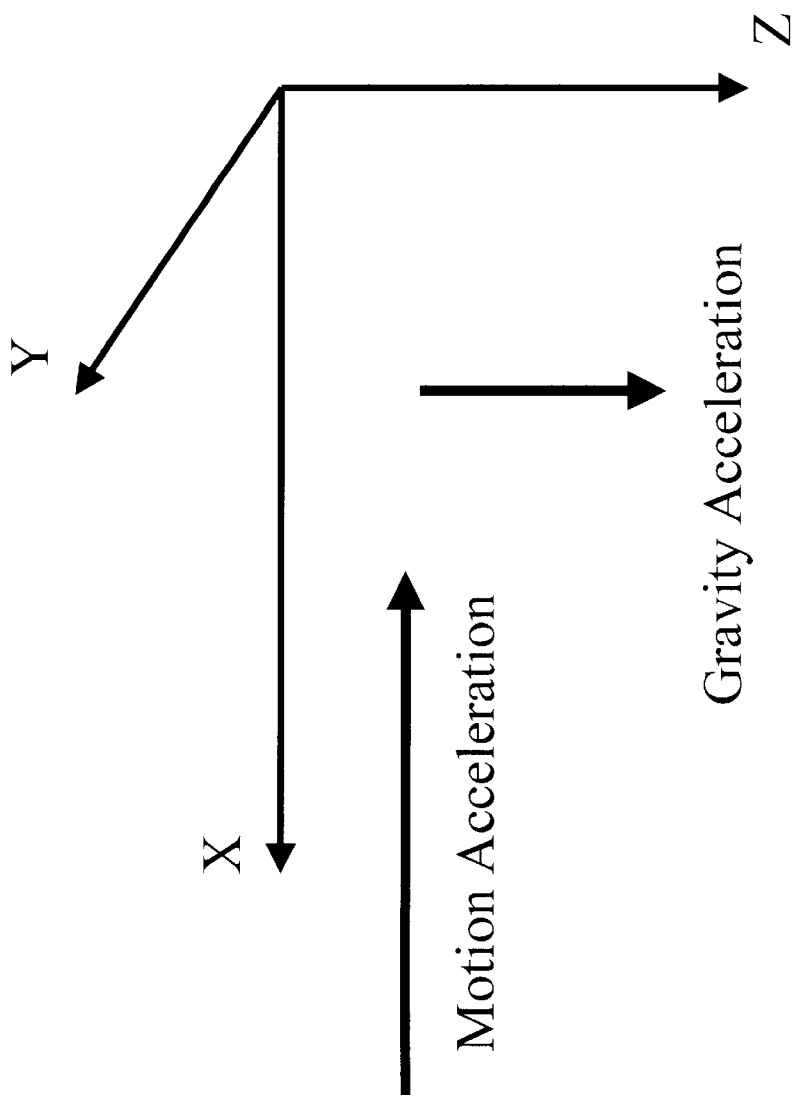
FIG. 6 illustrates the gravity acceleration and motion accelerations applied to the acceleration producer of the present invention when the platform is moving.

Digital filters can be designed and implemented by FIR (finite impulse response) based on convolution, or by IIR (infinite impulse response) based on recursion. The frequency responses of a low-pass filter is illustrated in FIG. 4, wherein the frequencies that are dropped into the passband are allowed to pass, while the frequencies that are dropped into the stopband are forced to stop.

The rotation vector generation module 844 receives the rough pitch and roll angle from the initial pitch and roll estimation module 82 to form a rotation vector, such as a quaternion, which is a vector representing the rotation motion of the platform.

The digital torquer module 843 forms a set of torquer rates using the input X and Y components of the level-plane gravity acceleration data.

If the rough pitch and roll angles are error free and the acceleration producer does not have measurement error, the input X and Y components of the level-plane gravity acceleration data should be zero, The rotation vector updating module 845 updates the rotation vector using the set of torquer rates. The updated quaternion is output to the attitude matrix computation module 846.

The attitude matrix computation module 846 computes the transform matrix using the input updated quaternion; and the transform matrix is fed back to a level-plane gravity acceleration computation module 83 and the pitch and roll extraction module 847.

The pitch and roll extraction module 847 extracts the pitch and roll angle using the transform matrix, outputting the pitch and roll angle to the magnetic heading estimation module 87 and the user interface processing module 88.

In some applications, the heading information is not needed. Therefore, referring to FIG. 5, the first alternative embodiment of the system of the present invention comprises:

an acceleration producer 1, for measuring the gravity acceleration analog signals in three-axes expressed in body frame;

a conditioning and analog/digital converting circuitry 4, for suppressing noises of the gravity acceleration analog signals and digitizing the gravity acceleration analog signals to form three-axes gravity acceleration digital signals;

a DSP chipset 8, interfaced with the conditioning and analog/digital converting circuitry 4, for receiving the three-axes gravity acceleration digital signals and producing the pitch and roll angle using the DSP algorithms; and a user interface 9, connected with the DSP chipset 8, for providing a user with the data display and I/O (Input/Out) functions.

In the above embodiment, the platform is assumed to be static, so that the input to the acceleration producer is only gravity acceleration. The operation of principle for the digital torquer module is that the level-plane gravity acceleration should be zero if the real attitude matrix is achieved.

However, if the platform is moving, the input to the acceleration producer 1 includes not only gravity acceleration, but also motion acceleration. In order to deal with motion of the platform, so that the system of present invention can be applied to a mobile platform, the second alternative embodiment of the system of the present invention further comprises:

A velocity producer 7, for providing the platform velocity measurements expressed in the body frame.

Figure 7:
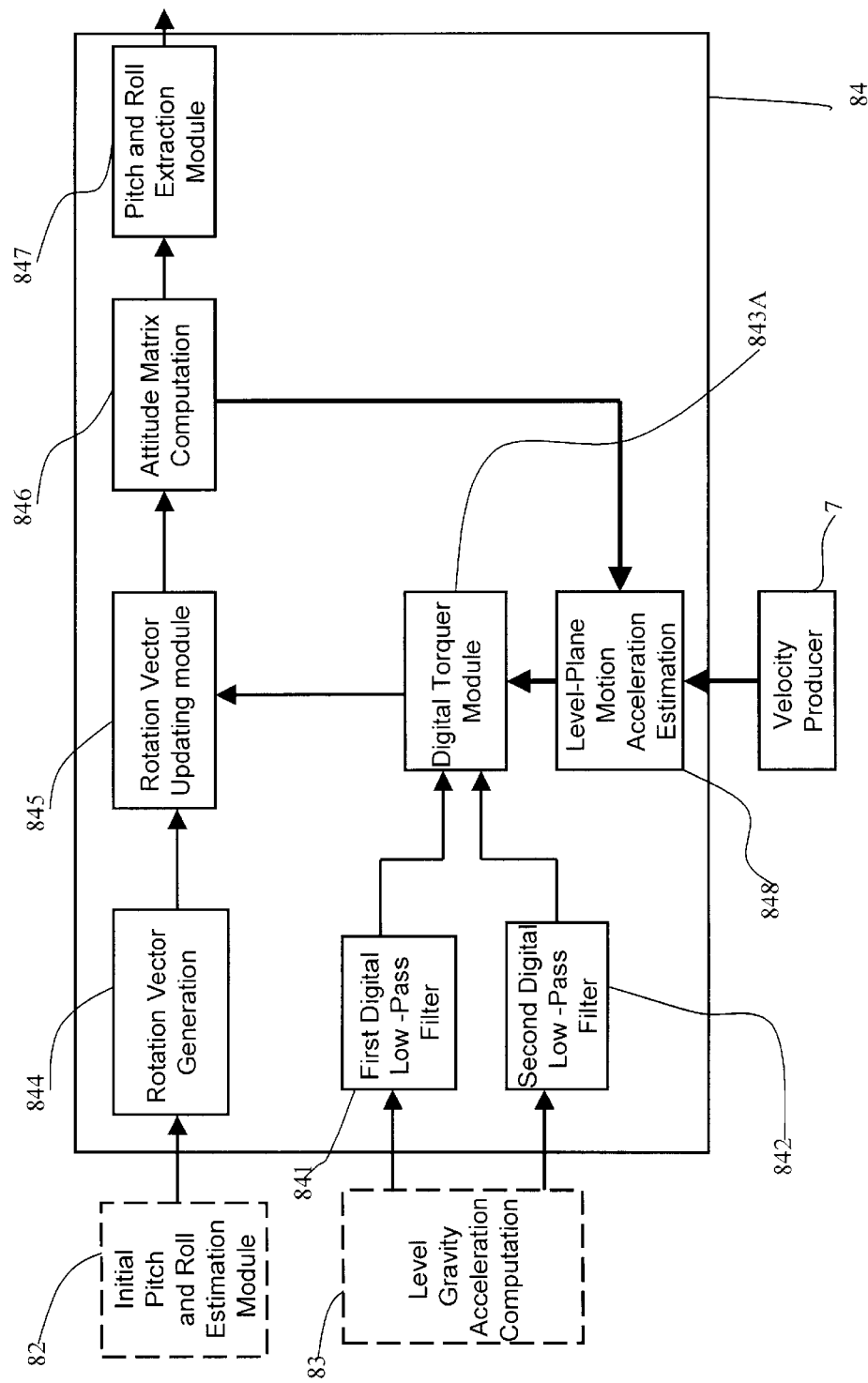
FIG. 7 a block diagram illustrating the second alternative embodiment of the present invention to deal with platform motion.

Referring to FIG. 7, within the second alternative embodiment of the system of the present invention, accordingly, the pitch and roll refinement loop closure module 84 further comprises:

a level-plane motion acceleration estimation module 848, for receiving the platform velocity measurements expressed in the body frame from the velocity producer 7 and the attitude matrix from the attitude matrix computation 846, wherein the attitude matrix represents the transformation from the platform body frame to the level-plane frame, to estimate the level-plane motion acceleration, which is input to the digital torquer module 843A, wherein the motion acceleration in the level-plane acceleration from the first digital low-pass filter 841 and the second digital low-pass filter 842 are removed using the level-plane motion acceleration estimates from the level-plane motion acceleration estimation module 848.

Referring to FIGS. 1 to 3, the digital signal processing method for orientation measurement comprises the steps of:

(1) measuring threes axes gravity acceleration signals in analog form by an acceleration producer 1;

(2) suppressing noise of the threes axes gravity acceleration signals and digitizing the threes axes gravity acceleration signals to form digital three-axes gravity acceleration signals;

(3) detecting an analog Earth's magnetic field vector measurement by an Earth's magnetic field detector 2 to obtain three-axes Earth magnetic field vector signals;

(4) digitizing the three-axes Earth magnetic field vector signals to form digital three-axes Earth magnetic field vector signals; and (5) producing pitch, roll, and heading angle using the digital three-axes gravity acceleration signals and the digital three-axes Earth magnetic field vector signals with DSP algorithms.

In some application, the acceleration producer 1 and the Earth's magnetic field detector 2 can provide digital outputs. Therefor, the first alternative embodiment of the digital signal processing method for orientation measurement comprises:

(1) measuring digital threes axes gravity acceleration signals by an acceleration producer 1;

(2) detecting digital Earth's magnetic field vector measurement by an Earth's magnetic field detector 2.

(3) producing the pitch, roll, and heading angle using the digital three-axes gravity acceleration signals and the digital three-axes Earth magnetic field vector signals with DSP algorithms.

If an acceleration producer is put in an ideal level-plane, the output of the acceleration producer should be zero. Therefore, the second alternative embodiment of the digital signal processing method to determine a level-plane for platform orientation measurements comprises the steps of:

(1) gathering the acceleration measurements about level-plane to form a acceleration measurement array; and (2) determining the level-plane by means of searching the acceleration measurement array to find the null point at where the acceleration measurement is zero.

What is claimed is:

1. A digital signal processing system for orientation measurements of a body frame, comprising:

an acceleration producer, measuring gravity acceleration analog signals in orthogonal three-axes expressed in said body frame;

a conditioning and analog/digital converting circuitry, suppressing noises of said gravity acceleration analog signals and digitizing said gravity acceleration analog signals to form three-axes gravity acceleration digital signals;

a Digital Signal Processor (DSP) chipset, which is interfaced with said conditioning and analog/digital converting circuitry, receiving said three-axes gravity acceleration digital signals and producing pitch and roll angle using DSP algorithms;

a user interface, which is connected with said DSP chipset, for displaying, inputting and outputting measurement data;

an Earth's Magnetic Field (EMF) detector, detecting Earth's magnetic field analog signals in three-axes expressed in said body frame; and an EMF conditioning and analog/digital converting circuitry, suppressing noise of said Earth's magnetic field analog signals and digitizing said Earth's magnetic field analog signals to form three-axes Earth's magnetic field digital signals;

wherein said DSP chipset is further interfaced with said EMF conditioning and analog/digital converting circuitry to receive a three-axes digital Earth's magnetic field vector and produce attitude and heading measurements using said DSP algorithms;

wherein said conditioning and analog/digital converting circuitry, which is connected between said acceleration producer and said DSP chipset, substantially acquires said gravity acceleration analog signals, which are proportional to an Earth's gravity field, from said acceleration producer;

amplifies said gravity acceleration analog signals to suppress said noises in said gravity acceleration analog signal to form amplified gravity acceleration signals, wherein said noises are signals of said gravity acceleration analog signals not proportional to said Earth's gravity field;

converts said amplified gravity acceleration signals to form said three-axes gravity acceleration digital signals which are input to said DSP chipset; and provides data/control/address bus connection with said DSP chipset so as to produce an address decode function to enable said DSP chipset to access said acceleration producer and pickup said three-axes gravity acceleration signals;

wherein said DSP chipset comprises a first pre-processing module, an initial pitch and roll estimation module, a level-plane gravity acceleration computation module, a pitch and roll refinement loop closure module, a second pre-processing module, a magnetic field vector error compensation module, and a magnetic heading estimation module, said first pre-processing module smoothing said three-axes gravity acceleration digital signals expressed in said body frame at high sampling rate, and compensating errors in said three-axes gravity acceleration digital signals with calibration parameters, including scale factor, bias and misalignment, so as to achieve and output smoothed and compensated three-axes gravity acceleration digital signals to said initial pitch and roll estimation module and said level-plane gravity acceleration computation module;

said initial pitch and roll estimation module receiving said smoothed and compensated three-axes gravity acceleration digital signals from said first pre-processing module and running one time initially to provide rough pitch and roll angle estimates;

said level-plane gravity acceleration computation module receiving said smoothed three-axes gravity acceleration digital signals and a transform matrix from said body frame to a level-plane frame from said pitch and roll refinement loop closure module, and transforming said smoothed three-axes gravity acceleration digital signals into gravity acceleration data expressed in said level-plane frame;

said pitch and roll refinement loop closure module receiving said rough pitch and roll angle from said initial pitch and roll estimation module, level-plane plane gravity acceleration components from said level-plane gravity acceleration computation module, and heading angle from said magnetic heading estimation module, so as to refine said rough pitch and roll angles;

said second pre-processing module smoothing said three-axes digital Earths magnetic signals at high sampling rate, which are expressed in said body frame, wherein said smoothed three-axes Earth's magnetic digital signals are output to said magnetic field vector error compensation module;

said magnetic field vector error compensation module performing a compensation procedure using calibration parameters, including scale factors, misalignment parameters, and effects of nearby ferrous materials;

said magnetic heading estimation module receiving said three-axes digital Earth's magnetic field signals from said error compensation module of said magnetic field vector and said pitch and roll angle data from said pitch and roll refinement loop closure module to estimate an optimal heading angle, which is output to said pitch and roll refinement loop closure module.

2. The digital signal processing system, as recited in claim 1, wherein said magnetic heading estimation module receives said pitch and roll angle data from said pitch and roll refinement loop closure module to form a transformation matrix from said body frame to a level-plane frame, transforms said Earth's magnetic vector from said body frame to said level-plane frame to form a measurement vector, which is expressed in said level-plane frame, and estimates magnetic heading data using said measurement vector expressed in said level-plane frame, which is output to said pitch and roll refinement loop closure module and said user interface.

3. The digital signal processing system, as recited in claim 2, wherein said pitch and roll refinement loop closure module further comprises a first digital low pass filter, a second digital low pass filter, a rotation vector generation module, a digital torquer module, a rotation vector updating module, an attitude matrix computation module, and a pitch and roll extraction module, said first digital low pass filter receiving a X component of said level-plane gravity acceleration data from said level-plane gravity acceleration computation module to reject high frequency noises of said X component of said level-plane gravity acceleration data to obtain a filtered X component of said level-plane gravity acceleration data which is output to said digital torquer module;

said second digital low pass filter receiving a Y component of said level-plane gravity acceleration data from said level-plane gravity acceleration computation module to reject high frequency noises of said Y component of said level-plane gravity acceleration data to obtain a filtered Y component of said level-plane gravity acceleration data which is output to said digital torquer module;

said rotation vector generation module receiving said rough pitch and roll angle from said initial pitch and roll estimation module to form a rotation vector representing said rotation motion of said body frame;

said digital torquer module forming a set of torquer rates using said X and Y components of said level-plane gravity acceleration data;

said rotation vector updating module updating said rotation vector using said set of torquer rates, wherein said updated rotation vector is output to said attitude matrix computation module;

said attitude matrix computation module computing said transform matrix using said input updated rotation vector; wherein said transform matrix is fed back to said level-plane gravity acceleration computation module and said pitch and roll extraction module;

said pitch and roll extraction module extracting said pitch and roll angle using said transform matrix, outputting said pitch and roll angle to said magnetic heading estimation module and said user interface.

4. A digital signal processing system for orientation measurements of a body frame, comprising:

an acceleration producer, measuring gravity acceleration analog signals in orthogonal three-axes expressed in said body frame, wherein said acceleration producer comprises three MEMS accelerometers, which are orthogonally installed to achieve orthogonal three-axes gravity acceleration measurements;

a conditioning and analog/digital converting circuitry, suppressing noises of said gravity acceleration analog signals and digitizing said gravity acceleration analog signals to form three-axes gravity acceleration digital signals;

a Digital Signal Processor (DSP) chipset, which is interfaced with said conditioning and analog/digital converting circuitry, receiving said three-axes gravity acceleration digital signals and producing pitch and roll angle using DSP algorithms;

a user interface, which is connected with said DSP chipset, for displaying, inputting and outputting measurement data;

an Earth's Magnetic Field (EMF) detector, detecting Earth's magnetic field analog signals in three-axes expressed in said body frame; and an EMF conditioning and analog/digital converting circuitry, suppressing noise of said Earth's magnetic field analog signals and digitizing said Earth's magnetic field analog signals to form three-axes Earth's magnetic field digital signals;

wherein said DSP chipset is further interfaced with said EMF conditioning and analog/digital converting circuitry to receive a three-axes digital Earth's magnetic field vector and produce attitude and heading measurements using said DSP algorithms;

wherein said conditioning and analog/digital converting circuitry, which is connected between said acceleration producer and said DSP chipset, substantially acquires said gravity acceleration analog signals, which are proportional to an Earth's gravity field, from said acceleration producer;

amplifies said gravity acceleration analog signals to suppress said noises in said gravity acceleration analog signal to form amplified gravity acceleration signals, wherein said noises are signals of said gravity acceleration analog signals not proportional to said Earth's gravity field;

converts said amplified gravity acceleration signals to form said three-axes gravity acceleration digital signals which are input to said DSP chipset; and provides data/control/address bus connection with said DSP chipset so as to produce an address decode function to enable said DSP chipset to access said acceleration producer and pickup said three-axes gravity acceleration signals;

wherein said DSP chipset comprises a first pre-processing module, an initial pitch and roll estimation module, a level-plane gravity acceleration computation module, a pitch and roll refinement loop closure module, a second pre-processing module, a magnetic field vector error compensation module, and a magnetic heading estimation module, said first pre-processing module smoothing said three-axes gravity acceleration digital signals expressed in said body frame at high sampling rate, and compensating errors in said three-axes gravity acceleration digital signals with calibration parameters, including scale factor, bias and misalignment, so as to achieve and output smoothed and compensated three-axes gravity acceleration digital signals to said initial pitch and roll estimation module and said level-plane gravity acceleration computation module;

said initial pitch and roll estimation module receiving said smoothed and compensated three-axes gravity acceleration digital signals from said first pre-processing module and running one time initially to provide rough pitch and roll angle estimates;

said level-plane gravity acceleration computation module receiving said smoothed three-axes gravity acceleration digital signals and a transform matrix from said body frame to a level-plane frame from said pitch and roll refinement loop closure module, and transforming said smoothed three-axes gravity acceleration digital signals into gravity acceleration data expressed in said level-plane frame;

said pitch and roll refinement loop closure module receiving said rough pitch and roll angle from said initial pitch and roll estimation module, level-plane plane gravity acceleration components from said level-plane gravity acceleration computation module, and heading angle from said magnetic heading estimation module, so as to refine said rough pitch and roll angles;

said second pre-processing module smoothing said three-axes digital Earth's magnetic signals at high sampling rate, which are expressed in said body frame, wherein said smoothed three-axes Earth's magnetic digital signals are output to said magnetic field vector error compensation module;

said magnetic field vector error compensation module performing a compensation procedure using calibration parameters, including scale factors, misalignment parameters, and effects of nearby ferrous materials;

said magnetic heading estimation module receiving said three-axes digital Earth's magnetic field signals from said error compensation module of said magnetic field vector and said pitch and roll angle data from said pitch and roll refinement loop closure module to estimate an optimal heading angle, which is output to said pitch and roll refinement loop closure module.

5. The digital signal processing system, as recited in claim 4, wherein said magnetic heading estimation module receives said pitch and roll angle data from said pitch and roll refinement loop closure module to form a transformation matrix from said body frame to a level-plane frame, transforms said Earth's magnetic vector from said body frame to said level-plane frame to form a measurement vector, which is expressed in said level-plane frame, and estimates magnetic heading data using said measurement vector expressed in said level-plane frame, which is output to said pitch and roll refinement loop closure module and said user interface.

6. The digital signal processing system, as recited in claim 5, wherein said pitch and roll refinement loop closure module further comprises a first digital low pass filter, a second digital low pass filter, a rotation vector generation module, a digital torquer module, a rotation vector updating module, an attitude matrix computation module, and a pitch and roll extraction module, said first digital low pass filter receiving a X component of said level-plane gravity acceleration data from said level-plane gravity acceleration computation module to reject high frequency noises of said X component of said level-plane gravity acceleration data to obtain a filtered X component of said level-plane gravity acceleration data which is output to said digital torquer module;

said second digital low pass filter receiving a Y component of said level-plane gravity acceleration data from said level-plane gravity acceleration computation module to reject high frequency noises of said Y component of said level-plane gravity acceleration data to obtain a filtered Y component of said level-plane gravity acceleration data which is output to said digital torquer module;

said rotation vector generation module receiving said rough pitch and roll angle from said initial pitch and roll estimation module to form a rotation vector representing said rotation motion of said body frame;

said digital torquer module forming a set of torquer rates using said X and Y components of said level-plane gravity acceleration data;

said rotation vector updating module updating said rotation vector using said set of torquer rates, wherein said updated rotation vector is output to said attitude matrix computation module;

said attitude matrix computation module computing said transform matrix using said input updated rotation vector; wherein said transform matrix is fed back to said level-plane gravity acceleration computation module and said pitch and roll extraction module;

said pitch and roll extraction module extracting said pitch and roll angle using said transform matrix, outputting said pitch and roll angle to said magnetic heading estimation module and said user interface.

7. A digital signal processing system for orientation measurements of a body frame, comprising:

an acceleration producer, measuring gravity acceleration analog signals in orthogonal three-axes expressed in said body frame, wherein said acceleration producer comprises three MEMS accelerometers, which are orthogonally installed to achieve orthogonal three-axes gravity acceleration measurements;

a conditioning and analog/digital converting circuitry, suppressing noises of said gravity acceleration analog signals and digitizing said gravity acceleration analog signals to form three-axes gravity acceleration digital signals;

a Digital Signal Processor (DSP) chipset, which is interfaced with said conditioning and analog/digital converting circuitry, receiving said three-axes gravity acceleration digital signals and producing pitch and roll angle using DSP algorithms;

a user interface, which is connected with said DSP chipset, for displaying, inputting and outputting measurement data;

an Earth's Magnetic Field (EMF) detector, detecting Earth's magnetic field analog signals in three-axes expressed in said body frame; and an EMF conditioning and analog/digital converting circuitry, suppressing noise of said Earth's magnetic field analog signals and digitizing said Earth's magnetic field analog signals to form three-axes Earth's magnetic field digital signals;

wherein said DSP chipset is further interfaced with said EMF conditioning and analog/digital converting circuitry to receive a three-axes digital Earth's magnetic field vector and produce attitude and heading measurements using said DSP algorithms;

wherein said Earth's magnetic field detector is a device for measuring said Earth's magnetic field vector, including a fluxgate, magnetoresistance (MR) sensor, and magnetoinductive sensors;

wherein said conditioning and analog/digital converting circuitry, which is connected between said acceleration producer and said DSP chipset, substantially acquires said gravity acceleration analog signals, which are proportional to an Earth's gravity field, from said acceleration producer;

amplifies said gravity acceleration analog signals to suppress said noises in said gravity acceleration analog signal to form amplified gravity acceleration signals, wherein said noises are signals of said gravity acceleration analog signals not proportional to said Earth's gravity field;

converts said amplified gravity acceleration signals to form said three-axes gravity acceleration digital signals which are input to said DSP chipset; and provides data/control/address bus connection with said DSP chipset so as to produce an address decode function to enable said DSP chipset to access said acceleration producer and pickup said three-axes gravity acceleration signals;

wherein said DSP chipset comprises a first pre-processing module, an initial pitch and roll estimation module, a level-plane gravity acceleration computation module, a pitch and roll refinement loop closure module, a second pre-processing module, a magnetic field vector error compensation module, and a magnetic heading estimation module, said first pre-processing module smoothing said three-axes gravity acceleration digital signals expressed in said body frame at high sampling rate, and compensating errors in said three-axes gravity acceleration digital signals with calibration parameters, including scale factor, bias and misalignment, so as to achieve and output smoothed and compensated three-axes gravity acceleration digital signals to said initial pitch and roll estimation module and said level-plane gravity acceleration computation module;

said initial pitch and roll estimation module receiving said smoothed and compensated three-axes gravity acceleration digital signals from said first pre-processing module and running one time initially to provide rough pitch and roll angle estimates;

said level-plane gravity acceleration computation module receiving said smoothed three-axes gravity acceleration digital signals and a transform matrix from said body frame to a level-plane frame from said pitch and roll refinement loop closure module, and transforming said smoothed three-axes gravity acceleration digital signals into gravity acceleration data expressed in said level-plane frame;

said pitch and roll refinement loop closure module receiving said rough pitch and roll angle from said initial pitch and roll estimation module, level-plane plane gravity acceleration components from said level-plane gravity acceleration computation module, and heading angle from said magnetic heading estimation module, so as to refine said rough pitch and roll angles;

said second pre-processing module smoothing said three-axes digital Earth's magnetic signals at high sampling rate, which are expressed in said body frame, wherein said smoothed three-axes Earths magnetic digital signals are output to said magnetic field vector error compensation module;

said magnetic field vector error compensation module performing a compensation procedure using calibration parameters, including scale factors, misalignment parameters, and effects of nearby ferrous materials;

said magnetic heading estimation module receiving said three-axes digital Earth's magnetic field signals from said error compensation module of said magnetic field vector and said pitch and roll angle data from said pitch and roll refinement loop closure module to estimate an optimal heading angle, which is output to said pitch and roll refinement loop closure module.

8. The digital signal processing system, as recited in claim 7, wherein said magnetic heading estimation module receives said pitch and roll angle data from said pitch and roll refinement loop closure module to form a transformation matrix from said body frame to a level-plane frame, transforms said Earth's magnetic vector from said body frame to said level-plane frame to form a measurement vector, which is expressed in said level-plane frame, and estimates magnetic heading data using said measurement vector expressed in said level-plane frame, which is output to said pitch and roll refinement loop closure module and said user interface.

9. The digital signal processing system, as recited in claim 8, wherein said pitch and roll refinement loop closure module further comprises a first digital low pass filter, a second digital low pass filter, a rotation vector generation module, a digital torquer module, a rotation vector updating module, an attitude matrix computation module, and a pitch and roll extraction module, said first digital low pass filter receiving a X component of said level-plane gravity acceleration data from said level-plane gravity acceleration computation module to reject high frequency noises of said X component of said level-plane gravity acceleration data to obtain a filtered X component of said level-plane gravity acceleration data which is output to said digital torquer module;

said second digital low pass filter receiving a Y component of said level-plane gravity acceleration data from said level-plane gravity acceleration computation module to reject high frequency noises of said Y component of said level-plane gravity acceleration data to obtain a filtered Y component of said level-plane gravity acceleration data which is output to said digital torquer module;

said rotation vector generation module receiving said rough pitch and roll angle from said initial pitch and roll estimation module to form a rotation vector representing said rotation motion of said body frame;

said digital torquer module forming a set of torquer rates using said X and Y components of said level-plane gravity acceleration data;

said rotation vector updating module updating said rotation vector using said set of torquer rates, wherein said updated rotation vector is output to said attitude matrix computation module;

said attitude matrix computation module computing said transform matrix using said input updated rotation vector; wherein said transform matrix is fed back to said level-plane gravity acceleration computation module and said pitch and roll extraction module;

said pitch and roll extraction module extracting said pitch and roll angle using said transform matrix, outputting said pitch and roll angle to said magnetic heading estimation module and said user interface.

10. A digital signal processing system for orientation measurements of a body frame, comprising:

an acceleration producer, measuring gravity acceleration analog signals in orthogonal three-axes expressed in said body frame;

a conditioning and analog/digital converting circuitry, suppressing noises of said gravity acceleration analog signals and digitizing said gravity acceleration analog signals to form three-axes gravity acceleration digital signals;

a Digital Signal Processor (DSP) chipset, which is interfaced with said conditioning and analog/digital converting circuitry, receiving said three-axes gravity acceleration digital signals and producing pitch and roll angle using DSP algorithms;

a user interface, which is connected with said DSP chipset, for displaying, inputting and outputting measurement data;

a velocity producer providing platform velocity measurements expressed in said body frame so as to produce a motion acceleration of said body frame to input into said acceleration producer; and an Earth's Magnetic Field (EMF) detector, detecting Earth's magnetic field analog signals in three-axes expressed in said body frame; and an EMF conditioning and analog/digital converting circuitry, suppressing noise of said Earth's magnetic field analog signals and digitizing said Earth's magnetic field analog signals to form three-axes Earth's magnetic field digital signals;

wherein said DSP chipset is further interfaced with said EMF conditioning and analog/digital converting circuitry to receive a three-axes digital Earth's magnetic field vector and produce attitude and heading measurements using said DSP algorithms;

wherein said conditioning and analog/digital converting circuitry, which is connected between said acceleration producer and said DSP chipset, substantially acquires said gravity acceleration analog signals, which are proportional to an Earth's gravity field, from said acceleration producer;

amplifies said gravity acceleration analog signals to suppress said noises in said gravity acceleration analog signal to form amplified gravity acceleration signals, wherein said noises are signals of said gravity acceleration analog signals not proportional to said Earth's gravity field;

converts said amplified gravity acceleration signals to form said three-axes gravity acceleration digital signals which are input to said DSP chipset; and provides data/control/address bus connection with said DSP chipset so as to produce an address decode function to enable said DSP chipset to access said acceleration producer and pickup said three-axes gravity acceleration signals;

wherein said DSP chipset comprises a first pre-processing module, an initial pitch and roll estimation module, a level-plane gravity acceleration computation module, a pitch and roll refinement loop closure module, a second pre-processing module, a magnetic field vector error compensation module, and a magnetic heading estimation module, said first pre-processing module smoothing said three-axes gravity acceleration digital signals expressed in said body frame at high sampling rate, and compensating errors in said three-axes gravity acceleration digital signals with calibration parameters, including scale factor, bias and misalignment, so as to achieve and output smoothed and compensated three-axes gravity acceleration digital signals to said initial pitch and roll estimation module and said level-plane gravity acceleration computation module;

said initial pitch and roll estimation module receiving said smoothed and compensated three-axes gravity acceleration digital signals from said first pre-processing module and running one time initially to provide rough pitch and roll angle estimates;

said level-plane gravity acceleration computation module receiving said smoothed three-axes gravity acceleration digital signals and a transform matrix from said body frame to a level-plane frame from said pitch and roll refinement loop closure module, and transforming said smoothed three-axes gravity acceleration digital signals into gravity acceleration data expressed in said level-plane frame;

said pitch and roll refinement loop closure module receiving said rough pitch and roll angle from said initial pitch and roll estimation module, level-plane plane gravity acceleration components from said level-plane gravity acceleration computation module, and heading angle from said magnetic heading estimation module, so as to refine said rough pitch and roll angles;

said second pre-processing module smoothing said three-axes digital Earth's magnetic signals at high sampling rate, which are expressed in said body frame, wherein said smoothed three-axes Earth's magnetic digital signals are output to said magnetic field vector error compensation module;

said magnetic field vector error compensation module performing a compensation procedure using calibration parameters, including scale factors, misalignment parameters, and effects of nearby ferrous materials;

said magnetic heading estimation module receiving said three-axes digital Earth's magnetic field signals from said error compensation module of said magnetic field vector and said pitch and roll angle data from said pitch and roll refinement loop closure module to estimate an optimal heading angle, which is output to said pitch and roll refinement loop closure module.

11. The digital signal processing system, as recited in claim 10, wherein said magnetic heading estimation module receives said pitch and roll angle data from said pitch and roll refinement loop closure module to form a transformation matrix from said body frame to a level-plane frame, transforms said Earth's magnetic vector from said body frame to said level-plane frame to form a measurement vector, which is expressed in said level-plane frame, and estimates magnetic heading data using said measurement vector expressed in said level-plane frame, which is output to said pitch and roll refinement loop closure module and said user interface.

12. The digital signal processing system, as recited in claim 11, wherein said pitch and roll refinement loop closure module further comprises a first digital low pass filter, a second digital low pass filter, a rotation vector generation module, a digital torquer module, a rotation vector updating module, an attitude matrix computation module, a pitch and roll extraction module, and a level-plane motion acceleration estimation module;

said first digital low pass filter receiving a X component of said level-plane gravity acceleration data from said level-plane gravity acceleration computation module to reject high frequency noises of said X component of said level-plane gravity acceleration data to obtain a filtered X component of said level-plane gravity acceleration data which is output to said digital torquer module;

said second digital low pass filter receiving a Y component of said level-plane gravity acceleration data from said level-plane gravity acceleration computation module to reject high frequency noises of said Y component of said level-plane gravity acceleration data to obtain a filtered Y component of said level-plane gravity acceleration data which is output to said digital torquer module;

said rotation vector generation module receiving said rough pitch and roll angle from said initial pitch and roll estimation module to form a rotation vector representing said rotation motion of said body frame;

said digital torquer module forming a set of torquer rates using said X and Y components of said level-plane gravity acceleration data;

said rotation vector updating module updating said rotation vector using said set of torquer rates, wherein said updated rotation vector is output to said attitude matrix computation module;

said attitude matrix computation module computing said transform matrix using said input updated rotation vector; wherein said transform matrix is fed back to said level-plane gravity acceleration computation module and said pitch and roll extraction module;

said pitch and roll extraction module extracting said pitch and roll angle using said transform matrix, outputting said pitch and roll angle to said magnetic heading estimation module and said user interface;

said level-plane motion acceleration estimation module receiving said platform velocity measurements expressed in said body frame from said velocity producer and an attitude matrix from said attitude matrix computation module, wherein said attitude matrix represents a transformation from said body frame to said level-plane frame, and producing said motion acceleration which is an estimated level-plane motion acceleration input to said digital torquer module, wherein said level-plane motion acceleration in said level-plane gravity acceleration from said first digital low pass filter and said second digital low-pass filter is removed using said estimated level-plane motion acceleration from said level-plane motion acceleration estimation module.

13. A digital signal processing system for orientation measurements of a body frame, comprising:

an acceleration producer, measuring gravity acceleration analog signals in orthogonal three-axes expressed in said body frame, wherein said acceleration producer comprises three MEMS accelerometers, which are orthogonally installed to achieve orthogonal three-axes gravity acceleration measurements;

a conditioning and analog/digital converting circuitry, suppressing noises of said gravity acceleration analog signals and digitizing said gravity acceleration analog signals to form three-axes gravity acceleration digital signals;

a Digital Signal Processor (DSP) chipset, which is interfaced with said conditioning and analog/digital converting circuitry, receiving said three-axes gravity acceleration digital signals and producing pitch and roll angle using DSP algorithms;

a user interface, which is connected with said DSP chipset, for displaying, inputting and outputting measurement data;

a velocity producer providing platform velocity measurements expressed in said body frame so as to produce a motion acceleration of said body frame to input into said acceleration producer; and an Earth's Magnetic Field (EMF) detector, detecting Earth's magnetic field analog signals in three-axes expressed in said body frame; and an EMF conditioning and analog/digital converting circuitry, suppressing noise of said Earth's magnetic field analog signals and digitizing said Earth's magnetic field analog signals to form three-axes Earth's magnetic field digital signals;

wherein said DSP chipset is further interfaced with said EMF conditioning and analog/digital converting circuitry to receive a three-axes digital Earth's magnetic field vector and produce attitude and heading measurements using said DSP algorithms;

wherein said conditioning and analog/digital converting circuitry, which is connected between said acceleration producer and said DSP chipset, substantially acquires said gravity acceleration analog signals, which are proportional to an Earth's gravity field, from said acceleration producer;

amplifies said gravity acceleration analog signals to suppress said noises in said gravity acceleration analog signal to form amplified gravity acceleration signals, wherein said noises are signals of said gravity acceleration analog signals not proportional to said Earth's gravity field;

converts said amplified gravity acceleration signals to form said three-axes gravity acceleration digital signals which are input to said DSP chipset; and provides data/control/address bus connection with said DSP chipset so as to produce an address decode function to enable said DSP chipset to access said acceleration producer and pickup said three-axes gravity acceleration signals;

wherein said DSP chipset comprises a first pre-processing module, an initial pitch and roll estimation module, a level-plane gravity acceleration computation module, a pitch and roll refinement loop closure module, a second pre-processing module, a magnetic field vector error compensation module, and a magnetic heading estimation module, said first pre-processing module smoothing said three-axes gravity acceleration digital signals expressed in said body frame at high sampling rate, and compensating errors in said three-axes gravity acceleration digital signals with calibration parameters, including scale factor, bias and misalignment, so as to achieve and output smoothed and compensated three-axes gravity acceleration digital signals to said initial pitch and roll estimation module and said level-plane gravity acceleration computation module;

said initial pitch and roll estimation module receiving said smoothed and compensated three-axes gravity acceleration digital signals from said first pre-processing module and running one time initially to provide rough pitch and roll angle estimates;

said level-plane gravity acceleration computation module receiving said smoothed three-axes gravity acceleration digital signals and a transform matrix from said body frame to a level-plane frame from said pitch and roll refinement loop closure module, and transforming said smoothed three-axes gravity acceleration digital signals into gravity acceleration data expressed in said level-plane frame;

said pitch and roll refinement loop closure module receiving said rough pitch and roll angle from said initial pitch and roll estimation module, level-plane plane gravity acceleration components from said level-plane gravity acceleration computation module, and heading angle from said magnetic heading estimation module, so as to refine said rough pitch and roll angles;

said second pre-processing module smoothing said three-axes digital Earth's magnetic signals at high sampling rate, which are expressed in said body frame, wherein said smoothed three-axes Earth's magnetic digital signals are output to said magnetic field vector error compensation module;

said magnetic field vector error compensation module performing a compensation procedure using calibration parameters, including scale factors, misalignment parameters, and effects of nearby ferrous materials;

said magnetic heading estimation module receiving said three-axes digital Earth's magnetic field signals from said error compensation module of said magnetic field vector and said pitch and roll angle data from said pitch and roll refinement loop closure module to estimate an optimal heading angle, which is output to said pitch and roll refinement loop closure module.

14. The digital signal processing system, as recited in claim 13, wherein said magnetic heading estimation module receives said pitch and roll angle data from said pitch and roll refinement loop closure module to form a transformation matrix from said body frame to a level-plane frame, transforms said Earth's magnetic vector from said body frame to said level-plane frame to form a measurement vector, which is expressed in said level-plane frame, and estimates magnetic heading data using said measurement vector expressed in said level-plane frame, which is output to said pitch and roll refinement loop closure module and said user interface.

15. The digital signal processing system, as recited in claim 14, wherein said pitch and roll refinement loop closure module further comprises a first digital low pass filter, a second digital low pass filter, a rotation vector generation module, a digital torquer module, a rotation vector updating module, an attitude matrix computation module, a pitch and roll extraction module, and a level-plane motion acceleration estimation module;

said first digital low pass filter receiving a X component of said level-plane gravity acceleration data from said level-plane gravity acceleration computation module to reject high frequency noises of said X component of said level-plane gravity acceleration data to obtain a filtered X component of said level-plane gravity acceleration data which is output to said digital torquer module;

said second digital low pass filter receiving a Y component of said level-plane gravity acceleration data from said level-plane gravity acceleration computation module to reject high frequency noises of said Y component of said level-plane gravity acceleration data to obtain a filtered Y component of said level-plane gravity acceleration data which is output to said digital torquer module;

said rotation vector generation module receiving said rough pitch and roll angle from said initial pitch and roll estimation module to form a rotation vector representing said rotation motion of said body frame;

said digital torquer module forming a set of torquer rates using said X and Y components of said level-plane gravity acceleration data;

said rotation vector updating module updating said rotation vector using said set of torquer rates, wherein said updated rotation vector is output to said attitude matrix computation module;

said attitude matrix computation module computing said transform matrix using said input updated rotation vector; wherein said transform matrix is fed back to said level-plane gravity acceleration computation module and said pitch and roll extraction module;

said pitch and roll extraction module extracting said pitch and roll angle using said transform matrix, outputting said pitch and roll angle to said magnetic heading estimation module and said user interface;

said level-plane motion acceleration estimation module receiving said platform velocity measurements expressed in said body frame from said velocity producer and an attitude matrix from said attitude matrix computation module, wherein said attitude matrix represents a transformation from said body frame to said level-plane frame, and producing said motion acceleration which is an estimated level-plane motion acceleration input to said digital torquer module, wherein said level-plane motion acceleration in said level-plane gravity acceleration from said first digital low pass filter and said second digital low-pass filter is removed using said estimated level-plane motion acceleration from said level-plane motion acceleration estimation module.

16. A digital signal processing system for orientation measurements of a body frame, comprising:

an acceleration producer, measuring gravity acceleration analog signals in orthogonal three-axes expressed in said body frame, wherein said acceleration producer comprises three MEMS accelerometers, which are orthogonally installed to achieve orthogonal three-axes gravity acceleration measurements;

a conditioning and analog/digital converting circuitry, suppressing noises of said gravity acceleration analog signals and digitizing said gravity acceleration analog signals to form three-axes gravity acceleration digital signals;

a Digital Signal Processor (DSP) chipset, which is interfaced with said conditioning and analog/digital converting circuitry, receiving said three-axes gravity acceleration digital signals and producing pitch and roll angle using DSP algorithms;

a user interface, which is connected with said DSP chipset, for displaying, inputting and outputting measurement data;

a velocity producer providing platform velocity measurements expressed in said body frame so as to produce a motion acceleration of said body frame to input into said acceleration producer; and an Earth's Magnetic Field (EMF) detector, detecting Earth's magnetic field analog signals in three-axes expressed in said body frame; and an EMF conditioning and analog/digital converting circuitry, suppressing noise of said Earth's magnetic field analog signals and digitizing said Earth's magnetic field analog signals to form three-axes Earth's magnetic field digital signals;

wherein said DSP chipset is further interfaced with said EMF conditioning and analog/digital converting circuitry to receive a three-axes digital Earth's magnetic field vector and produce attitude and heading measurements using said DSP algorithms;

wherein said Earth's magnetic field detector is a device for measuring said Earth's magnetic field vector, including a fluxgate, magnetoresistance (MR) sensor, and magnetoinductive;

wherein said conditioning and analog/digital converting circuitry, which is connected between said acceleration producer and said DSP chipset, substantially acquires said gravity acceleration analog signals, which are proportional to an Earth's gravity field, from said acceleration producer;

amplifies said gravity acceleration analog signals to suppress said noises in said gravity acceleration analog signal to form amplified gravity acceleration signals, wherein said noises are signals of said gravity acceleration analog signals not proportional to said Earth's gravity field;

converts said amplified gravity acceleration signals to form said three-axes gravity acceleration digital signals which are input to said DSP chipset; and provides data/control/address bus connection with said DSP chipset so as to produce an address decode function to enable said DSP chipset to access said acceleration producer and pickup said three-axes gravity acceleration signals;

wherein said DSP chipset comprises a first pre-processing module, an initial pitch and roll estimation module, a level-plane gravity acceleration computation module, a pitch and roll refinement loop closure module, a second pre-processing module, a magnetic field vector error compensation module, and a magnetic heading estimation module, said first pre-processing module smoothing said three-axes gravity acceleration digital signals expressed in said body frame at high sampling rate, and compensating errors in said three-axes gravity acceleration digital signals with calibration parameters, including scale factor, bias and misalignment, so as to achieve and output smoothed and compensated three-axes gravity acceleration digital signals to said initial pitch and roll estimation module and said level-plane gravity acceleration computation module;

said initial pitch and roll estimation module receiving said smoothed and compensated three-axes gravity acceleration digital signals from said first pre-processing module and running one time initially to provide rough pitch and roll angle estimates;

said level-plane gravity acceleration computation module receiving said smoothed three-axes gravity acceleration digital signals and a transform matrix from said body frame to a level-plane frame from said pitch and roll refinement loop closure module, and transforming said smoothed three-axes gravity acceleration digital signals into gravity acceleration data expressed in said level-plane frame;

said pitch and roll refinement loop closure module receiving said rough pitch and roll angle from said initial pitch and roll estimation module, level-plane plane gravity acceleration components from said level-plane gravity acceleration computation module, and heading angle from said magnetic heading estimation module, so as to refine said rough pitch and roll angles;

said second pre-processing module smoothing said three-axes digital Earth's magnetic signals at high sampling rate, which are expressed in said body frame, wherein said smoothed three-axes Earth's magnetic digital signals are output to said magnetic field vector error compensation module;

said magnetic field vector error compensation module performing a compensation procedure using calibration parameters, including scale factors, misalignment parameters, and effects of nearby ferrous materials;

said magnetic heading estimation module receiving said three-axes digital Earth's magnetic field signals from said error compensation module of said magnetic field vector and said pitch and roll angle data from said pitch and roll refinement loop closure module to estimate an optimal heading angle, which is output to said pitch and roll refinement loop closure module.

17. The digital signal processing system, as recited in claim 16, wherein said magnetic heading estimation module receives said pitch and roll angle data from said pitch and roll refinement loop closure module to form a transformation matrix from said body frame to a level-plane frame, transforms said Earth's magnetic vector from said body frame to said level-plane frame to form a measurement vector, which is expressed in said level-plane frame, and estimates magnetic heading data using said measurement vector expressed in said level-plane frame, which is output to said pitch and roll refinement loop closure module and said user interface.

18. The digital signal processing system, as recited in claim 17, wherein said pitch and roll refinement loop closure module further comprises a first digital low pass filter, a second digital low pass filter, a rotation vector generation module, a digital torquer module, a rotation vector updating module, an attitude matrix computation module, a pitch and roll extraction module, and a level-plane motion acceleration estimation module;

said first digital low pass filter receiving a X component of said level-plane gravity acceleration data from said level-plane gravity acceleration computation module to reject high frequency noises of said X component of said level-plane gravity acceleration data to obtain a filtered X component of said level-plane gravity acceleration data which is output to said digital torquer module;

said second digital low pass filter receiving a Y component of said level-plane gravity acceleration data from said level-plane gravity acceleration computation module to reject high frequency noises of said Y component of said level-plane gravity acceleration data to obtain a filtered Y component of said level-plane gravity acceleration data which is output to said digital torquer module;

said rotation vector generation module receiving said rough pitch and roll angle from said initial pitch and roll estimation module to form a rotation vector representing said rotation motion of said body frame;

said digital torquer module forming a set of torquer rates using said X and Y components of said level-plane gravity acceleration data;

said rotation vector updating module updating said rotation vector using said set of torquer rates, wherein said updated rotation vector is output to said attitude matrix computation module;

said attitude matrix computation module computing said transform matrix using said input updated rotation vector; wherein said transform matrix is fed back to said level-plane gravity acceleration computation module and said pitch and roll extraction module;

said pitch and roll extraction module extracting said pitch and roll angle using said transform matrix, outputting said pitch and roll angle to said magnetic heading estimation module and said user interface;

said level-plane motion acceleration estimation module receiving said platform velocity measurements expressed in said body frame from said velocity producer and an attitude matrix from said attitude matrix computation module, wherein said attitude matrix represents a transformation from said body frame to said level-plane frame, and producing said motion acceleration which is an estimated level-plane motion acceleration input to said digital torquer module, wherein said level-plane motion acceleration in said level-plane gravity acceleration from said first digital low pass filter and said second digital low-pass filter is removed using said estimated level-plane motion acceleration from said level-plane motion acceleration estimation module.

19. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals; and (e) producing pitch, roll and heading angles using said three-axes gravity acceleration digital signals and said digital three-axes Earth's magnetic field vector signals by a Digital Signal Processor (DSP) chipset;

wherein the step (e) further comprises the steps of:

(e-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(e-2) running one time initially to provide estimated pitch and roll angles;

(e-3) transforming said smoothed three-axes gravity acceleration digital signals into gravity acceleration data expressed in a level-plane frame;

(e-4) refining said estimated pitch and roll angles;

(e-5) smoothing said three-axes digital Earth's magnetic signals at high sampling rate, which are expressed in said body frame, to achieve smoothed three-axes Earth's magnetic digital signals;

(e-6) performing a compensation procedure using calibration parameters, including scale factors, misalignment parameters, and effects of nearby ferrous materials; and (e-7) producing an optimal heading angle;

wherein the step (e-7) further comprises the steps of:
  (e-7-1) forming a transformation matrix from said body frame to a level-plane frame,
  (e-7-2) transforming said Earth's magnetic vector from said body frame to said level-plane frame to form a measurement vector, which is expressed in said level-plane frame, and
  (e-7-3) estimating magnetic heading data using said measurement vector expressed in said level-plane frame.

20. The digital signal processing method, as recited in claim 19, wherein the step (e-4) further comprises the steps of:

(e-4-1) receiving a X component of level-plane gravity acceleration data to reject high frequency noises of said X component of said level-plane gravity acceleration data to obtain a filtered X component of said level-plane gravity acceleration data;

(e-4-2) receiving a Y component of said level-plane gravity acceleration data to reject high frequency noises of said Y component of level-plane gravity acceleration data to obtain a filtered Y component of said level-plane gravity acceleration data;

(e-4-3) receiving said estimated pitch and roll angles to form a rotation vector representing a rotation motion of said body frame;

(e-4-5) forming a set of torquer rates using said X and Y components of said level-plane gravity acceleration data;

(e-4-6) updating said rotation vector using said set of torquer rates;

(e-4-7) computing said transform matrix using said input updated rotation vector; and (e-4-8) extracting pitch and roll angles using said transform matrix.

21. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals;

(e) providing platform velocity measurements expressed in said body frame by a velocity producer for producing a motion acceleration of said body frame and inputting into said acceleration producer; and (f) producing pitch, roll and heading angles using said three-axes gravity acceleration digital signals and said digital three-axes Earth's magnetic field vector signals by a Digital Signal Processor (DSP) chipset;

wherein the step (f) further comprises the steps of:
  (f-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;
  (f-2) running one time initially to provide estimated pitch and roll angles;
  (f-3) transforming said smoothed three-axes gravity acceleration digital signals into gravity acceleration data expressed in a level-plane frame;
  (f-4) refining said estimated pitch and roll angles;
  (f-5) smoothing said three-axes digital Earth's magnetic signals at high sampling rate, which are expressed in said body frame, to achieve smoothed three-axes Earth's magnetic digital signals;
  (f-6) performing a compensation procedure using calibration parameters, including scale factors, misalignment parameters, and effects of nearby ferrous materials; and
  (f-7) producing an optimal heading angle;

wherein the step (f-7) further comprises the steps of:
  (f-7-1) forming a transformation matrix from said body frame to a level-plane frame,
  (f-7-2) transforming said Earth's magnetic vector from said body frame to said level-plane frame to form a measurement vector, which is expressed in said level-plane frame, and
  (f-7-3) estimating magnetic heading data using said measurement vector expressed in said level-plane frame.

22. The digital signal processing method, as recited in claim 21, wherein the step (f-4) further comprises the steps of:

(f-4-1) receiving a X component of level-plane gravity acceleration data to reject high frequency noises of said X component of said level-plane gravity acceleration data to obtain a filtered X component of said level-plane gravity acceleration data;

(f-4-2) receiving a Y component of said level-plane gravity acceleration data to reject high frequency noises of said Y component of level-plane gravity acceleration data to obtain a filtered Y component of said level-plane gravity acceleration data;

(f-4-3) receiving said estimated pitch and roll angles to form a rotation vector representing a rotation motion of said body frame;

(f-4-5) forming a set of torquer rates using said X and Y components of said level-plane gravity acceleration data;

(f-4-6) updating said rotation vector using said set of torquer rates;

(f-4-7) computing said transform matrix using said input updated rotation vector;

(f-4-8) extracting pitch and roll angles using said transform matrix; and (f-4-9) removing said motion acceleration from said level-plane gravity acceleration data.

23. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earths magnetic field detector to achieve analog three-axes Earth's magnetic field vector signals;

(d) digitizing said analog three-axes Earth's magnetic field vector signals to form digital three-axes Earth's magnetic field vector signals; and (e) producing pitch, roll and heading angles using said three-axes gravity acceleration digital signals and said digital three-axes Earth's magnetic field vector signals by a Digital Signal Processor (DSP) chipset;

wherein the step (b) further comprises the steps of:

(b-1) acquiring said gravity acceleration analog signals, which are proportional to an Earth's gravity field, from said acceleration producer;

(b-2) amplifying said gravity acceleration analog signals to suppress said noises in said gravity acceleration analog signal to form amplified gravity acceleration signals, wherein said noises are signals of said gravity acceleration analog signals not proportional to said Earth's gravity field;

(b-3) converting said amplified gravity acceleration signals to form said three-axes gravity acceleration digital signals which are input to said DSP chipset; and (b-4) providing data/control/address bus connection with said DSP chipset so as to produce an address decode function to enable said DSP chipset to access said acceleration producer and pickup said three-axes gravity acceleration signals;

wherein the step (e) further comprises the steps of:

(e-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(e-2) running one time initially to provide estimated pitch and roll angles;

(e-3) transforming said smoothed three-axes gravity acceleration digital signals into gravity acceleration data expressed in a level-plane frame;

(e-4) refining said estimated pitch and roll angles;

(e-5) smoothing said three-axes digital Earth's magnetic signals at high sampling rate, which are expressed in said body frame, to achieve smoothed three-axes Earth's magnetic digital signals;

(e-6) performing a compensation procedure using calibration parameters, including scale factors, misalignment parameters, and effects of nearby ferrous materials; and (e-7) producing an optimal heading angle;

wherein the step (e-7) further comprises the steps of:

(e-7-1) forming a transformation matrix from said body frame to a level-plane frame, (e-7-2) transforming said Earth's magnetic vector from said body frame to said level-plane frame to form a measurement vector, which is expressed in said level-plane frame, and (e-7-3) estimating magnetic heading data using said measurement vector expressed in said level-plane frame.

24. The digital signal processing method, as recited in claim 23, wherein the step (e-4) further comprises the steps of:

(e-4-1) receiving a X component of level-plane gravity acceleration data to reject high frequency noises of said X component of said level-plane gravity acceleration data to obtain a filtered X component of said level-plane gravity acceleration data;

(e-4-2) receiving a Y component of said level-plane gravity acceleration data to reject high frequency noises of said Y component of level-plane gravity acceleration data to obtain a filtered Y component of said level-plane gravity acceleration data;

(e-4-3) receiving said estimated pitch and roll angles to form a rotation vector representing a rotation motion of said body frame;

(e-4-5) forming a set of torquer rates using said X and Y components of said level-plane gravity acceleration data;

(e-4-6) updating said rotation vector using said set of torquer rates;

(e-4-7) computing said transform matrix using said input updated rotation vector; and (e-4-8) extracting pitch and roll angles using said transform matrix.

25. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals;

(e) providing platform velocity measurements expressed in said body frame by a velocity producer for producing a motion acceleration of said body frame and inputting into said acceleration producer; and (f) producing pitch, roll and heading angles using said three-axes gravity acceleration digital signals and said digital three-axes Earth's magnetic field vector signals by a Digital Signal Processor (DSP) chipset;

wherein the step (b) further comprises the steps of:

(b-1) acquiring said gravity acceleration analog signals, which are proportional to an Earth's gravity field, from said acceleration producer;

(b-2) amplifying said gravity acceleration analog signals to suppress said noises in said gravity acceleration analog signal to form amplified gravity acceleration signals, wherein said noises are signals of said gravity acceleration analog signals not proportional to said Earth's gravity field;

(b-3) converting said amplified gravity acceleration signals to form said three-axes gravity acceleration digital signals which are input to said DSP chipset; and (b-4) providing data/control/address bus connection with said DSP chipset so as to produce an address decode function to enable said DSP chipset to access said acceleration producer and pickup said three-axes gravity acceleration signals;

wherein the step (f) further comprises the steps of:

(f-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(f-2) running one time initially to provide estimated pitch and roll angles;

(f-3) transforming said smoothed three-axes gravity acceleration digital signals into gravity acceleration data expressed in a level-plane frame;

(f-4) refining said estimated pitch and roll angles;

(f-5) smoothing said three-axes digital Earth's magnetic signals at high sampling rate, which are expressed in said body frame, to achieve smoothed three-axes Earth's magnetic digital signals;

(f-6) performing a compensation procedure using calibration parameters, including scale factors, misalignment parameters, and effects of nearby ferrous materials; and (f-7) producing an optimal heading angle; wherein the step (e-7) further comprises the steps of:

(f-7-1) forming a transformation matrix from said body frame to a level-plane frame, (f-7-2) transforming said Earth's magnetic vector from said body frame to said level-plane frame to form a measurement vector, which is expressed in said level-plane frame, and (f-7-3) estimating magnetic heading data using said measurement vector expressed in said level-plane frame.

26. The digital signal processing method, as recited in claim 25, wherein the step (e-4) further comprises the steps of:

(f-4-1) receiving a X component of level-plane gravity acceleration data to reject high frequency noises of said X component of said level-plane gravity acceleration data to obtain a filtered X component of said level-plane gravity acceleration data;

(f-4-2) receiving a Y component of said level-plane gravity acceleration data to reject high frequency noises of said Y component of level-plane gravity acceleration data to obtain a filtered Y component of said level-plane gravity acceleration data;

(f-4-3) receiving said estimated pitch and roll angles to form a rotation vector representing a rotation motion of said body frame;

(f-4-5) forming a set of torquer rates using said X and Y components of said level-plane gravity acceleration data;

(f-4-6) updating said rotation vector using said set of torquer rates;

(f-4-7) computing said transform matrix using said input updated rotation vector;

(f-4-8) extracting pitch and roll angles using said transform matrix; and (f-4-9) removing said motion acceleration from said level-plane gravity acceleration data.

27. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals; and (e) producing pitch, roll and heading angles using said three-axes gravity acceleration digital signals and said digital three-axes Earth's magnetic field vector signals by a Digital Signal Processor (DSP) chipset;

wherein the step (e) further comprises the steps of:

(e-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(e-2) running one time initially to provide estimated pitch and roll angles;

(e-3) transforming said smoothed three-axes gravity acceleration digital signals into gravity acceleration data expressed in a level-plane frame;

(e-4) refining said estimated pitch and roll angles;

(e-5) smoothing said three-axes digital Earth's magnetic signals at high sampling rate, which are expressed in said body frame, to achieve smoothed three-axes Earth's magnetic digital signals;

(e-6) performing a compensation procedure using calibration parameters, including scale factors, misalignment parameters, and effects of nearby ferrous materials; and (e-7) producing an optimal heading angle;

wherein the step (e-4) further comprises the steps of:

(e-4-1) receiving a X component of level-plane gravity acceleration data to reject high frequency noises of said X component of said level-plane gravity acceleration data to obtain a filtered X component of said level-plane gravity acceleration data;

(e-4-2) receiving a Y component of said level-plane gravity acceleration data to reject high frequency noises of said Y component of level-plane gravity acceleration data to obtain a filtered Y component of said level-plane gravity acceleration data;

(e-4-3) receiving said estimated pitch and roll angles to form a rotation vector representing a rotation motion of said body frame;

(e-4-5) forming a set of torquer rates using said X and Y components of said level-plane gravity acceleration data;

(e-4-6) updating said rotation vector using said set of torquer rates;

(e-4-7) computing said transform matrix using said input updated rotation vector; and (e-4-8) extracting pitch and roll angles using said transform matrix.

28. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals; and (e) producing pitch, roll and heading angles using said three-axes gravity acceleration digital signals and said digital three-axes Earth's magnetic field vector signals by a Digital Signal Processor (DSP) chipset;

wherein the step (b) further comprises the steps of:

(b-1) acquiring said gravity acceleration analog signals, which are proportional to an Earth's gravity field, from said acceleration producer;

(b-2) amplifying said gravity acceleration analog signals to suppress said noises in said gravity acceleration analog signal to form amplified gravity acceleration signals, wherein said noises are signals of said gravity acceleration analog signals not proportional to said Earth's gravity field;

(b-3) converting said amplified gravity acceleration signals to form said three-axes gravity acceleration digital signals which are input to said DSP chipset; and (b-4) providing data/control/address bus connection with said DSP chipset so as to produce an address decode function to enable said DSP chipset to access said acceleration producer and pickup said three-axes gravity acceleration signals;

wherein the step (e) further comprises the steps of:

(e-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(e-2) running one time initially to provide estimated pitch and roll angles;

(e-3) transforming said smoothed three-axes gravity acceleration digital signals into gravity acceleration data expressed in a level-plane frame;

(e-4) refining said estimated pitch and roll angles;

(e-5) smoothing said three-axes digital Earth's magnetic signals at high sampling rate, which are expressed in said body frame, to achieve smoothed three-axes Earth's magnetic digital signals;

(e-6) performing a compensation procedure using calibration parameters, including scale factors, misalignment parameters, and effects of nearby ferrous materials; and (e-7) producing an optimal heading angle;

wherein the step (e-4) further comprises the steps of:

(e-4-1) receiving a X component of level-plane gravity acceleration data to reject high frequency noises of said X component of said level-plane gravity acceleration data to obtain a filtered X component of said level-plane gravity acceleration data;

(e-4-2) receiving a Y component of said level-plane gravity acceleration data to reject high frequency noises of said Y component of level-plane gravity acceleration data to obtain a filtered Y component of said level-plane gravity acceleration data;

(e-4-3) receiving said estimated pitch and roll angles to form a rotation vector representing a rotation motion of said body frame;

(e-4-5) forming a set of torquer rates using said X and Y components of said level-plane gravity acceleration data;

(e-4-6) updating said rotation vector using said set of torquer rates;

(e-4-7) computing said transform matrix using said input updated rotation vector; and (e-4-8) extracting pitch and roll angles using said transform matrix.

29. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals;

(e) providing platform velocity measurements expressed in said body frame by a velocity producer for producing a motion acceleration of said body frame and inputting into said acceleration producer; and (f) producing pitch, roll and heading angles using said three-axes gravity acceleration digital signals and said digital three-axes Earth's magnetic field vector signals by a Digital Signal Processor (DSP) chipset;

wherein the step (f) further comprises the steps of:

(f-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(f-2) running one time initially to provide estimated pitch and roll angles;

(f-3) transforming said smoothed three-axes gravity acceleration digital signals into gravity acceleration data expressed in a level-plane frame;

(f-4) refining said estimated pitch and roll angles;

(f-5) smoothing said three-axes digital Earth's magnetic signals at high sampling rate, which are expressed in said body frame, to achieve smoothed three-axes Earth's magnetic digital signals;

(f-6) performing a compensation procedure using calibration parameters, including scale factors, misalignment parameters, and effects of nearby ferrous materials; and (f-7) producing an optimal heading angle;

wherein the step (f-4) further comprises the steps of:

(f-4-1) receiving a X component of level-plane gravity acceleration data to reject high frequency noises of said X component of said level-plane gravity acceleration data to obtain a filtered X component of said level-plane gravity acceleration data;

(f-4-2) receiving a Y component of said level-plane gravity acceleration data to reject high frequency noises of said Y component of level-plane gravity acceleration data to obtain a filtered Y component of said level-plane gravity acceleration data;

(f-4-3) receiving said estimated pitch and roll angles to form a rotation vector representing a rotation motion of said body frame;

(f-4-5) forming a set of torquer rates using said X and Y components of said level-plane gravity acceleration data;

(f-4-6) updating said rotation vector using said set of torquer rates;

(f-4-7) computing said transform matrix using said input updated rotation vector;

(f-4-8) extracting pitch and roll angles using said transform matrix; and (f-4-9) removing said motion acceleration from said level-plane gravity acceleration data.

30. A digital signal processing method for orientation measurements of a body frame, comprising the steps of:

(a) measuring three-axes gravity acceleration analog signals by an acceleration producer;

(b) suppressing noises of said three-axes gravity acceleration analog signals and digitizing said three-axes gravity acceleration analog signals to form three-axes gravity acceleration digital signals;

(c) detecting Earth's magnetic field vector measurement by an Earth's magnetic field detector to achieve analog three-axes Earth's magnetic field vector signals;

(d) digitizing said analog three-axes Earth's magnetic field vector signals to form digital three-axes Earth's magnetic field vector signals; and (e) providing platform velocity measurements expressed in said body frame by a velocity producer for producing a motion acceleration of said body frame and inputting into said acceleration producer;

(f) producing pitch, roll and heading angles using said three-axes gravity acceleration digital signals and said digital three-axes Earth's magnetic field vector signals by a Digital Signal Processor (DSP) chipset;

wherein the step (b) further comprises the steps of:

(b-1) acquiring said gravity acceleration analog signals, which are proportional to an Earth's gravity field, from said acceleration producer;

(b-2) amplifying said gravity acceleration analog signals to suppress said noises in said gravity acceleration analog signal to form amplified gravity acceleration signals, wherein said noises are signals of said gravity acceleration analog signals not proportional to said Earth's gravity field;

(b-3) converting said amplified gravity acceleration signals to form said three-axes gravity acceleration digital signals which are input to said DSP chipset; and (b-4) providing data/control/address bus connection with said DSP chipset so as to produce an address decode function to enable said DSP chipset to access said acceleration producer and pickup said three-axes gravity acceleration signals;

wherein the step (f) further comprises the steps of:

(f-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;

(f-2) running one time initially to provide estimated pitch and roll angles;

(f-3) transforming said smoothed three-axes gravity acceleration digital signals into gravity acceleration data expressed in a level-plane frame (f-4) refining said estimated pitch and roll angles;

(f-5) smoothing said three-axes digital Earth's magnetic signals at high sampling rate, which are expressed in said body frame, to achieve smoothed three-axes Earth's magnetic digital signals;

(f-6) performing a compensation procedure using calibration parameters, including scale factors, misalignment parameters, and effects of nearby ferrous materials; and (f-7) producing an optimal heading angle;

wherein the step (f-4) further comprises the steps of:

(f-4-1) receiving a X component of level-plane gravity acceleration data to reject high frequency noises of said X component of said level-plane gravity acceleration data to obtain a filtered X component of said level-plane gravity acceleration data;

(f-4-2) receiving a Y component of said level-plane gravity acceleration data to reject high frequency noises of said Y component of level-plane gravity acceleration data to obtain a filtered Y component of said level-plane gravity acceleration data;

(f-4-3) receiving said estimated pitch and roll angles to form a rotation vector representing a rotation motion of said body frame;

(f-4-5) forming a set of torquer rates using said X and Y components of said level-plane gravity acceleration data;

(f-4-6) updating said rotation vector using said set of torquer rates;

(f-4-7) computing said transform matrix using said input updated rotation vector;

(f-4-8) extracting pitch and roll angles using said transform matrix; and (f-4-9) removing said motion acceleration from said level-plane gravity acceleration data.

31. A digital signal processing method for orientation measurements of a body frame, comprising the steps of:

(a) measuring threes axes gravity acceleration digital signals by an acceleration producer;

(b) detecting Earth's magnetic field vector measurement by an Earth's magnetic field detector to achieve digital three-axes Earth's magnetic field vector signals; and (c) producing pitch, roll, and heading angles using said three-axes gravity acceleration digital signals and said digital three-axes Earth magnetic field vector signals by a Digital Signal Processor (DSP) chipset;

wherein the step (c) further comprises the steps of:
(c-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;
(c-2) running one time initially to provide estimated pitch and roll angles;
(c-3) transforming said smoothed three-axes gravity acceleration digital signals into gravity acceleration data expressed in a level-plane frame;
(c-4) refining said estimated pitch and roll angles;
(c-5) smoothing said three-axes digital Earth's magnetic signals at high sampling rate, which are expressed in said body frame, to achieve smoothed three-axes Earth's magnetic digital signals;
(c-6) performing a compensation procedure using calibration parameters, including scale factors, misalignment parameters, and effects of nearby ferrous materials; and
(c-7) producing an optimal heading angle;
wherein the step (c-7) further comprises the steps of:
(c-7-1) forming a transformation matrix from said body frame to a level-plane frame,
(c-7-2) transforming said Earth's magnetic vector from said body frame to said level-plane frame to form a measurement vector, which is expressed in said level-plane frame, and
(c-7-3) estimating magnetic heading data using said measurement vector expressed in said level-plane frame.

32. The digital signal processing method, as recited in claim 31, wherein the step (c-4) further comprises the steps of:
(c-4-1) receiving a X component of level-plane gravity acceleration data to reject high frequency noises of said X component of said level-plane gravity acceleration data to obtain a filtered X component of said level-plane gravity acceleration data;
(c-4-2) receiving a Y component of said level-plane gravity acceleration data to reject high frequency noises of said Y component of level-plane gravity acceleration data to obtain a filtered Y component of said level-plane gravity acceleration data;
(c-4-3) receiving said estimated pitch and roll angles to form a rotation vector representing a rotation motion of said body frame;
(c-4-5) forming a set of torquer rates using said X and Y components of said level-plane gravity acceleration data;
(c-4-6) updating said rotation vector using said set of torquer rates;
(c-4-7) computing said transform matrix using said input updated rotation vector, and
(c-4-8) extracting pitch and roll angles using said transform matrix.

33. A digital signal processing method for orientation measurements of a body frame, comprising the steps of:
(a) measuring threes axes gravity acceleration digital signals by an acceleration producer;
(b) detecting Earth's magnetic field vector measurement by an Earth's magnetic field detector to achieve digital three-axes Earth's magnetic field vector signals; and
(c) providing platform velocity measurements expressed in said body frame by a velocity producer for producing a motion acceleration of said body frame and inputting into said acceleration producer;
(d) producing pitch, roll, and heading angles using said three-axes gravity acceleration digital signals and said digital three-axes Earth magnetic field vector signals by a Digital Signal Processor (DSP) chipset;
wherein the step (d) further comprises the steps of:
(d-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;
(d-2) running one time initially to provide estimated pitch and roll angles;
(d-3) transforming said smoothed three-axes gravity acceleration digital signals into gravity acceleration data expressed in a level-plane frame;
(d-4) refining said estimated pitch and roll angles;
(d-5) smoothing said three-axes digital Earth's magnetic signals at high sampling rate, which are expressed in said body frame, to achieve smoothed three-axes Earth's magnetic digital signals;
(d-6) performing a compensation procedure using calibration parameters, including scale factors, misalignment parameters, and effects of nearby ferrous materials; and
(d-7) producing an optimal heading angle;
wherein the step (d-7) further comprises the steps of:
(d-7-1) forming a transformation matrix from said body frame to a level-plane frame,
(d-7-2) transforming said Earth's magnetic vector from said body frame to said level-plane frame to form a measurement vector, which is expressed in said level-plane frame, and
(d-7-3) estimating magnetic heading data using said measurement vector expressed in said level-plane frame.

34. The digital signal processing method, as recited in claim 33 wherein the step (d-4) further comprises the steps of:
(d-4-1) receiving a X component of level-plane gravity acceleration data to reject high frequency noises of said X component of said level-plane gravity acceleration data to obtain a filtered X component of said level-plane gravity acceleration data;
(d-4-2) receiving a Y component of said level-plane gravity acceleration data to reject high frequency noises of said Y component of level-plane gravity acceleration data to obtain a filtered Y component of said level-plane gravity acceleration data;
(d-4-3) receiving said estimated pitch and roll angles to form a rotation vector representing a rotation motion of said body frame;
(d-4-5) forming a set of torquer rates using said X and Y components of said level-plane gravity acceleration data;
(d-4-6) updating said rotation vector using said set of torquer rates;
(d-4-7) computing said transform matrix using said input updated rotation vector;
(d-4-8) extracting pitch and roll angles using said transform matrix; and (d-4-9) removing said motion acceleration from said level-plane gravity acceleration data.

35. A digital signal processing method for orientation measurements of a body frame, comprising the steps of:
(a) measuring threes axes gravity acceleration digital signals by an acceleration producer;
(b) detecting Earth's magnetic field vector measurement by an Earth's magnetic field detector to achieve digital three-axes Earth's magnetic field vector signals; and
(c) producing pitch, roll, and heading angles using said three-axes gravity acceleration digital signals and said digital three-axes Earth magnetic field vector signals by a Digital Signal Processor (DSP) chipset;

wherein the step (c) further comprises the steps of:
(c-2) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;
(c-2) running one time initially to provide estimated pitch and roll angles;
(c-3) transforming said smoothed three-axes gravity acceleration digital signals into gravity acceleration data expressed in a level-plane frame;
(c-4) refining said estimated pitch and roll angles;
(c-5) smoothing said three-axes digital Earth's magnetic signals at high sampling rate, which are expressed in said body frame, to achieve smoothed three-axes Earth's magnetic digital signals;
(c-6) performing a compensation procedure using calibration parameters, including scale factors, misalignment parameters, and effects of nearby ferrous materials; and
(c-7) producing an optimal heading angle;

wherein the step (c-4) further comprises the steps of:
(c-4-1) receiving a X component of level-plane gravity acceleration data to reject high frequency noises of said X component of said level-plane gravity acceleration data to obtain a filtered X component of said level-plane gravity acceleration data;
(c-4-2) receiving a Y component of said level-plane gravity acceleration data to reject high frequency noises of said Y component of level-plane gravity acceleration data to obtain a filtered Y component of said level-plane gravity acceleration data;
(c-4-3) receiving said estimated pitch and roll angles to form a rotation vector representing a rotation motion of said body frame;
(c-4-5) forming a set of torquer rates using said X and Y components of said level-plane gravity acceleration data;
(c-4-6) updating said rotation vector using said set of torquer rates;
(c-4-7) computing said transform matrix using said input updated rotation vector; and
(c-4-8) extracting pitch and roll angles using said transform matrix.

36. A digital signal processing method for orientation measurements of a body frame, comprising the steps of:
(a) measuring threes axes gravity acceleration digital signals by an acceleration producer;
(b) detecting Earth's magnetic field vector measurement by an Earth's magnetic field detector to achieve digital three-axes Earth's magnetic field vector signals; and
(c) providing platform velocity measurements expressed in said body frame by a velocity producer for producing a motion acceleration of said body frame and inputting into said acceleration producer;
(d) producing pitch, roll, and heading angles using said three-axes gravity acceleration digital signals and said digital three-axes Earth magnetic field vector signals by a Digital Signal Processor (DSP) chipset;

wherein the step (d) further comprises the steps of:
(d-1) smoothing said three-axes gravity acceleration digital signals expressed in said body frame at high sampling rate and compensating errors in said three-axes gravity acceleration digital signals with calibration parameters, including scale factor, bias and misalignment, so as to achieve smoothed and compensated three-axes gravity acceleration digital signals;
(d-2) running one time initially to provide estimated pitch and roll angles;
(d-3) transforming said smoothed three-axes gravity acceleration digital signals into gravity acceleration data expressed in a level-plane frame;
(d-4) refining said estimated pitch and roll angles;
(d-5) smoothing said three-axes digital Earth's magnetic signals at high sampling rate, which are expressed in said body frame, to achieve smoothed three-axes Earth's magnetic digital signals;
(d-6) performing a compensation procedure using calibration parameters, including scale factors, misalignment parameters, and effects of nearby ferrous materials; and
(d-7) producing an optimal heading angle;

wherein the step (d-4) further comprises the steps of:
(d-4-1) receiving a X component of level-plane gravity acceleration data to reject high frequency noises of said X component of said level-plane gravity acceleration data to obtain a filtered X component of said level-plane gravity acceleration data;
(d-4-2) receiving a Y component of said level-plane gravity acceleration data to reject high frequency noises of said Y component of level-plane gravity acceleration data to obtain a filtered Y component of said level-plane gravity acceleration data;
(d-4-3) receiving said estimated pitch and roll angles to form a rotation vector representing a rotation motion of said body frame;
(d-4-5) forming a set of torquer rates using said X and Y components of said level-plane gravity acceleration data;
(d-4-6) updating said rotation vector using said set of torquer rates;
(d-4-7) computing said transform matrix using said input updated rotation vector;
(d-4-8) extracting pitch and roll angles using said transform matrix; and
(d-4-9) removing said motion acceleration from said level-plane gravity acceleration data.

* * * * *